United States Patent
Itagaki

(10) Patent No.: US 9,327,718 B2
(45) Date of Patent: May 3, 2016

(54) HYBRID VEHICLE CONTROL APPARATUS

(71) Applicant: Toyota Jidosha Kabushiki Kaisha, Toyota-shi Aichi-ken (JP)

(72) Inventor: Kenji Itagaki, Suntou-gun Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/684,851

(22) Filed: Apr. 13, 2015

(65) Prior Publication Data

US 2015/0298686 A1    Oct. 22, 2015

(30) Foreign Application Priority Data

Apr. 22, 2014 (JP) .................. 2014-088532

(51) Int. Cl.
*B60W 10/02* (2006.01)
*B60W 20/00* (2016.01)
*B60W 10/08* (2006.01)

(52) U.S. Cl.
CPC ........... *B60W 20/1062* (2013.01); *B60W 10/02* (2013.01); *B60W 10/08* (2013.01); *B60W 2510/069* (2013.01); *B60W 2510/244* (2013.01); *B60W 2710/021* (2013.01); *B60W 2710/083* (2013.01); *Y10S 903/93* (2013.01)

(58) Field of Classification Search
CPC ...... B60W 10/02; B60W 10/08; Y10S 903/93
USPC ............................................. 701/22
See application file for complete search history.

(56) References Cited

U.S. PATENT DOCUMENTS

2015/0073644 A1* 3/2015 Reed ................... B60W 10/196
701/22

FOREIGN PATENT DOCUMENTS

| JP | 2004-050910 A | 2/2004 |
| JP | 2009001097 A | 1/2009 |

* cited by examiner

*Primary Examiner* — Tan Q Nguyen
(74) *Attorney, Agent, or Firm* — Dinsmore & Shohl LLP

(57) ABSTRACT

A hybrid vehicle control apparatus configured to control a hybrid vehicle having an engine, a first electrical rotating machine, a second electrical rotating machine, a power supply, and an engagement mechanism, is provided with: a specifying device configured to specify a state of the power supply; and a controlling device configured to select and perform one control on the basis of the specified state of the power supply and required torque of engine brake, from among a plurality of controls including (1) first control in which the engagement mechanism is controlled to be in a disengaged state and the first electrical rotating machine is controlled according to the required torque of the engine brake and (2) second control in which the engagement mechanism is set to be in an engaged state and the second electrical rotating machine is controlled according to the required torque, if the engine brake is required.

9 Claims, 10 Drawing Sheets

FIG. 4

| ENGINE BRAKE REQUIRED TORQUE | REFERENCE CONTROL (EV) | FIRST CONTROL (CVT) | THIRD CONTROL (CVT) | SECOND CONTROL (MG1 LOCK) |
|---|---|---|---|---|
| SMALL ($Tebn > Teb0$) | MG2 REGENERATION: SMALL | MODE A (MG1 REGENERATION) | MODE B (MG1 POWER RUNNING+MG2 POWER RUNNING) | MODE C ($Teb0$ +MG2 POWER RUNNING) |
| MEDIUM ($Tebn = Teb0$) | MG2 REGENERATION: MIDDLE | MODE D (EQUILIBRIUM) | MODE D (EQUILIBRIUM) | MODE E (LOCK HELD) |
| LARGE ($Tebn < Teb0$) | MG2 REGENERATION: LARGE | MODE F (MG1 POWER RUNNING) | MODE G (MG1 REGENERATION+ MG2 REGENERATION) | MODE H ($Teb0$ +MG2 REGENERATION) |

HYBRID VEHICLE CONTROL APPARATUS

CROSS-REFERENCE TO RELATED APPLICATIONS

This application is based upon and claims the benefit of priority of the prior Japanese Patent Application No. 2014-088532, file on Apr. 22, 2014, the entire contents of which are incorporated herein by reference.

BACKGROUND OF THE INVENTION

1. Field of the Invention

The present invention relates to a control apparatus for a hybrid vehicle.

2. Description of the Related Art

There is known a hybrid vehicle provided with an engine and two motors (refer to Patent Literature 1).

According to the vehicle disclosed in the Patent Literature 1, when a condition to cope with engine brake is satisfied, the engine and the two motors are controlled in such a manner that torque based on required torque is outputted to a drive shaft, with rotation of the engine continued at lower limit number of revolutions or more, regardless of the required torque and required power. It is therefore considered that the engine brake is allowed to act on drive wheels when the required torque is less than zero.

There is also proposed a hybrid vehicle configured to move into an engine brake mode to perform a regenerative operation of a generator if state of charge (SOC) of a battery exceeds a second upper limit, which is lower than a first upper limit at which charging is to be prohibited, in a case where vehicle required drive output has a negative value during motor traveling (refer to Patent Literature 2).

CITATION LIST

Patent Literature

Patent Literature 1: Japanese Patent Application Laid Open No. 2009-001097
Patent Literature 2: Japanese Patent Application Laid Open No. 2004-050910

In this type of hybrid vehicle, depending on a vehicle speed and engine brake required torque, a state of an electrical rotating machine changes between a power running state and a regenerative state when the engine brake is realized. Therefore, the engine brake required torque cannot be realized in some state of a power supply. In other words, the conventional technology has such a technical problem that it is hard to certainly generate the engine brake in a hybrid vehicle having a vehicle configuration in which the electrical rotating machine and the engine are coupled with a differential mechanism.

SUMMARY OF THE INVENTION

In view of the technical problems according to the present invention, it is therefore an object of the present invention to provide a hybrid vehicle control apparatus configured to certainly generate the engine brake.

The above object of the present invention can be achieved by a hybrid vehicle control apparatus configured to control a hybrid vehicle provided with: an engine; a drive shaft connected to drive wheels; a first electrical rotating machine; a differential mechanism comprising a plurality of rotating elements that perform a differential action on each other, including rotating elements each of which is coupled with the engine, the electrical rotating element, or the drive shaft; a second electrical rotating machine coupled with the drive shaft; and an engagement mechanism configured to fix one of the plurality of rotating elements in a non-rotatable manner in an engaged state in which a pair of engaging elements are engaged with each other and to limit rotation of the first electrical rotating machine, said hybrid vehicle control apparatus is provided with: a specifying device configured to specify a state of a power supply related to power input/output limit; and a controlling device configured to select and perform one control on the basis of the specified state of the power supply and required torque of engine brake, from among a plurality of controls including (1) first control in which the engagement mechanism is controlled to be in a disengaged state in which the pair of engaging elements are disengaged from each other and the first electrical rotating machine is controlled according to the required torque of the engine brake and (2) second control in which the engagement mechanism is set to be in the engaged state and the second electrical rotating machine is controlled according to the required torque, if the engine brake is required during operation of the engine.

The engagement mechanism according to the present invention fixes one rotating element of the differential mechanism in the non-rotatable manner in the engaged state, thereby limiting the rotation of the first electrical rotating machine. If the fixed one rotating element is a rotating element coupled with the first electrical rotating machine, the first electrical rotating machine becomes non-rotational, by which one example of the limit of the rotation is realized. Moreover, for example, if the differential mechanism has such a configuration that a plurality of differential mechanisms are combined or in similar cases, the rotating element other than the rotating elements coupled with the first electrical rotating element, the engine, and the drive shaft can be fixed in the non-rotatable manner. In this case, the rotation of the first electrical rotating machine is fixed at one number of revolutions determined by a gear ratio between the rotating elements of the differential mechanism, by which another example of the limit of the rotation is realized.

In the hybrid vehicle control apparatus according to the present invention, as control in which engine brake torque is allowed to act on the drive shaft or similar actions are performed to realize the engine brake, there are prepared the first control, which uses a speed adjusting function of the engine by the first electrical rotating machine, and the second control, which uses a rotation limit function of the first electrical rotating machine by the engagement mechanism.

In the first control, a drive state of the first electrical rotating machine is controlled according to engine brake required torque based on the drive shaft, which is determined, for example, from a vehicle speed, a shift range of a transmission, or the like.

Since the engine brake is brake that uses rotational resistance of the engine in a fuel cut state, the engine brake torque acting on the drive shaft increases with increasing number of engine revolutions. A rotational direction of the first electrical rotating machine for allowing the required torque of the engine brake (hereinafter abbreviated to "required torque" as occasion demands) to act on the drive shaft can be either a positive or negative direction. In contrast, the first electrical rotating machine always has positive torque for maintaining the engine, which does not spontaneously rotate, to be in a state of generating the engine brake torque according to the required torque. Thus, in the first control, the first electrical rotating machine is in the power-running state in a positive rotation state and is in the regenerative state in a negative rotation state.

Therefore, the engine brake torque by the first control does not sufficiently function for the required torque if power-running power (or discharge power) for power-running drive of the first electrical rotating machine cannot be supplied from the power supply, or if the power supply cannot receive regenerative power (or charge power) obtained by regenerative drive of the first electrical rotating machine, or in similar cases.

In contrast, in the second control in which the second electrical rotating machine is driven while the engagement mechanism is set to be in the engaged state, the engine brake toque according to the number of engine revolutions corresponding to the engaged state can be burdened by the engagement mechanism, by setting the engagement mechanism to be in the engaged state. In other words, the second electrical rotating machine is power-driven or regeneratively driven, according to excess and deficiency for the required torque. Therefore, in the second control, the input/output of electric power to/from the power supply decreases more than those in the first control. Necessarily, the second control is hardly influenced by the state of the power supply in comparison with the first control.

Now, according to the hybrid vehicle control apparatus according to the present invention, one control is selected and performed from among the plurality of controls including the first and second controls, on the basis of the state of the power supply related to the power input/output limit. For example, the second control is selected and performed if the power-running power or the regenerative power by the first control exceeds an allowable value of the power supply or in similar cases. Therefore, according to the hybrid vehicle control apparatus according to the present invention, the engine brake can be certainly generated if the engine brake is required.

Moreover, particularly if the first electrical rotating machine is regeneratively driven in the first control, the engine brake torque becomes excessive for the required torque because the number of engine revolutions is increased by setting the engagement mechanism to be in the engaged state. In contrast, if the first electrical rotating machine is power-driven, the engine brake torque becomes insufficient for the required torque because the number of engine revolutions is reduced by setting the engagement mechanism to be in the engaged state.

Necessarily, in the second control, the second electrical rotating machine becomes in the regenerative state or the power-running state in each case, and power input/output characteristics with respect to the power supply are reversed. In other words, the second electrical rotating machine is power-driven if the second control is selected by the input limit of the power supply, and the second electrical rotating machine is regeneratively driven if the second control is selected by the output limit. Therefore, in this case, the engine brake can be more certainly generated.

In another aspect of the hybrid vehicle control apparatus according to the present invention, the state of the power supply is a charge limit value and a discharge limit value, which are set on the basis of at least one of temperature of the power supply and a remaining charge amount, and said controlling device selects the second control (1) if regenerative power of the first electrical rotating machine by the first control exceeds the charge limit value, and/or (2) if power-running power of the first electrical rotating machine by the first control exceeds the discharge limit value.

According to this aspect, the second control is selected if the first control is hardly performed by the input/output limit of the power supply, and it is thus possible to suppress a frequent change into the engaged state of the engagement mechanism, which is efficient.

In this aspect, the plurality of controls include third control in which the engagement mechanism is controlled to be in the disengaged state and in which the first and second electrical rotating machines are controlled according to the required torque in such a manner that regenerative and power-running characteristics are reversed from those in the first control, and said controlling device selects the second control if the power-running power of the first electrical rotating machine in the first control exceeds the discharge limit value and if regenerative power of the first and second electrical rotating machines in the third control exceeds the charge limit value.

In this case, as control related to the engine brake, there is prepared the third control in addition to the first control and the second control. In the third control, the regenerative and power-running characteristics are reversed from those in the first control. In other words, if the first electrical rotating machine is power-driven in the first control, the first electrical rotating machine is regeneratively driven in the third control, and the engine brake torque, which is necessarily insufficient, is compensated by the regenerative drive of the second electrical rotating machine. In contrast, if the first electrical rotating machine is regeneratively driven in the first control, the first electrical rotating machine is power-driven, and the engine brake torque, which is necessarily excessive, is canceled by the power drive of the second electrical rotating machine.

Here, in the third control, as opposed to the second control in which a part of the engine brake torque is burdened by the engagement mechanism, the engine brake torque is covered by the input/output of the electric power between the first and second electrical rotating machines and the power supply, except for loss of an electrical system and a mechanical system. Therefore, the regenerative powers of the first and second electrical rotating machines in the third control have larger absolute values than that of the regenerative power of the second electrical rotating machine in the second control.

According to this aspect, the second control is selected if the regenerative power in the third control conflicts with an input limit value of the power supply. In other words, the third control is selected as long as the regeneration is possible. It is therefore possible to certainly generate the engine brake while efficiently charging the power supply.

The second control requires a change into the engaged state of the engagement mechanism. In the hybrid vehicle, the change into the engaged state is accompanied by a limit related to the vehicle speed, output, or the like in some cases. In other words, the limit unrelated to the engine brake can cause a case where the second control cannot be performed. According to the third control, the engine brake can be generated even in such a case, which is useful in practice.

In another aspect of the hybrid vehicle control apparatus according to the present invention, the engagement mechanism sets the first electrical rotating machine to be non-rotatable in the engaged state, and said controlling device selects the second control if the required torque corresponds to engine brake torque when number of revolutions of the first electrical rotating machine is zero in the first control.

If the number of revolutions of the first electrical rotating machine is zero in the first control, required output of the engine brake, which is determined by the engine brake required torque and number of revolutions of the drive shaft, substantially balances with the loss of the electrical system and the mechanical system, and there is no input/output of the electric power between the power supply and the first electrical rotating machine. Therefore, in practice, there is no high load on the power supply to the extent that this state is hardly continued.

On the other hand, the electric power required to set the engagement mechanism to be in the engaged state is less than the aforementioned loss.

Therefore, in the configuration in which the first electrical rotating machine is locked in the non-rotatable manner while the engagement mechanism is in the engaged state, the power consumption can be saved by selecting the second control if the required torque is substantially equal to the engine brake torque when the first electrical rotating machine has zero rotation in the first control.

Here, the case where the number of revolutions of the first electrical rotating machine is zero (i.e. a case where the number of revolutions of the first electrical rotating machine=0 holds) is considered; however, on a practical operational side, the first electrical rotating machine may be locked while the engagement mechanism is in the engaged state in a predetermined range including zero (i.e. a case where the number of revolutions of the first electrical rotating machine≈0 holds). The predetermined range may be also determined, for example, as a range in which a difference between deceleration when the engagement mechanism is set to be in the engaged state and deceleration by the required torque cannot be perceived by a driver, experimentally, experientially, or theoretically in advance.

In this aspect, the state of the power supply is a charge limit value and a discharge limit value, which are set on the basis of at least one of temperature of the power supply and a remaining charge amount, and the plurality of controls include third control in which the engagement mechanism is controlled to be in the disengaged state and in which the first and second electrical rotating machines are controlled according to the required torque in such a manner that regenerative and power-running characteristics are reversed from those in the first control, and said controlling device selects the second control if the required torque corresponds to engine brake torque when number of revolutions of the first electrical rotating machine is zero in the first control and further if regenerative power in the third control exceeds the charge limit value.

It is possible to efficiently charge the power supply by selecting the third control in a range in which the regenerative power when the first and second electrical rotating machines are both regeneratively driven in the third control does not conflict with the change limit value of the power supply.

The nature, utility, and further features of this invention will be more clearly apparent from the following detailed description with reference to a preferred embodiment of the invention when read in conjunction with the accompanying drawings briefly described below.

BRIEF DESCRIPTION OF THE DRAWINGS

FIG. 4 is a table explaining a correspondence relation between engine brake required torque and types of engine brake control;

DETAILED DESCRIPTION OF THE PREFERRED EMBODIMENT

<Embodiment of the Invention>

Hereinafter, a preferred embodiment of the present invention will be explained with reference to the drawings.

<Configuration of Embodiment>

Figure 1:
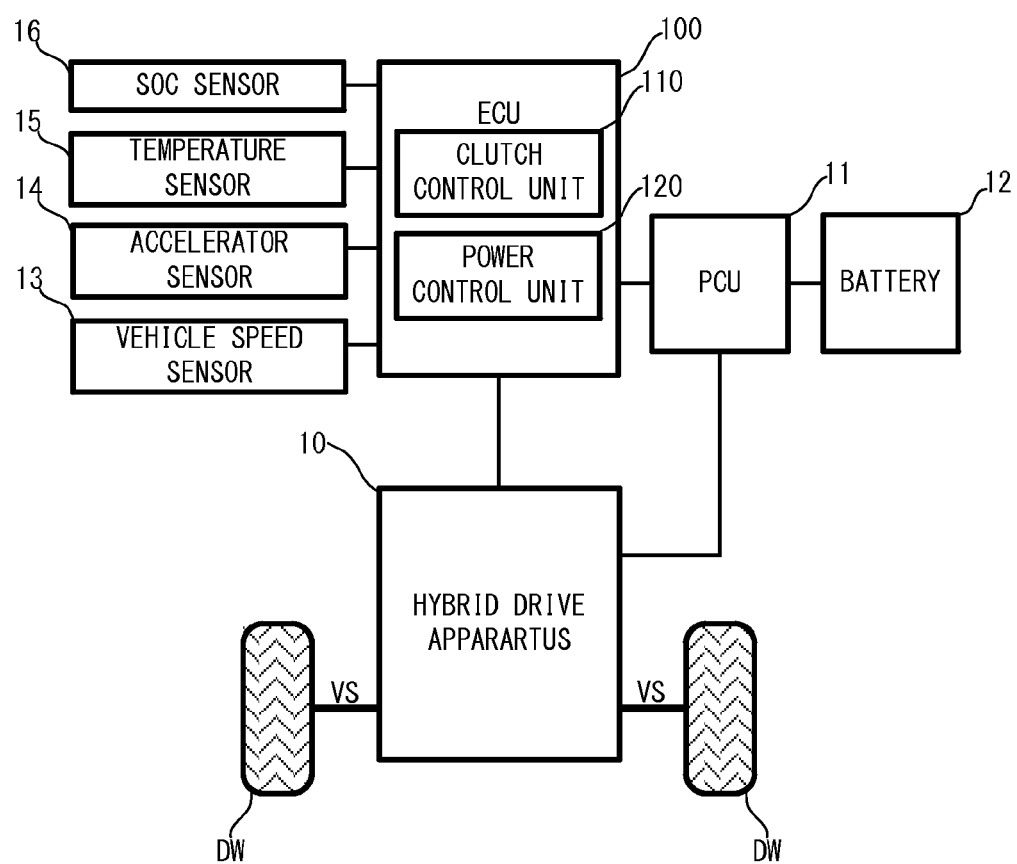
FIG. 1 is a schematic configuration diagram conceptually illustrating a configuration of a hybrid vehicle in one embodiment of the present invention.

Firstly, with reference to FIG. 1, a configuration of a hybrid vehicle 1 according to one embodiment of the present invention will be explained. FIG. 1 is a schematic configuration diagram conceptually illustrating the configuration of the hybrid vehicle 1.

In FIG. 1, the hybrid vehicle 1 is one example of the "hybrid vehicle" according to the present invention, provided with an electronic control unit (ECU) 100, a power control unit (PCU) 11, a battery 12, a vehicle speed sensor 13, an accelerator opening sensor 14, a temperature sensor 15, a state of charge (SOC) sensor 16, and a hybrid drive apparatus 10.

The ECU 100 is provided with a central processing unit (CPU), a read only memory (ROM), a RAM or the like, and is an electronic control unit configured to control operation of each unit of the hybrid vehicle 1. The ECU 100 is one example of the "hybrid vehicle control apparatus" according to the present invention. The ECU 100 is configured to perform various processes including an engine brake control process described later, in accordance with a control program stored in the ROM.

The ECU 100 is provided with a clutch control unit 110 and a power control unit 120. The clutch control unit 110 is an apparatus configured to control an operating state of a dog clutch mechanism 500 described later. Moreover, the power control unit 120 is an apparatus configured to control operating states of an engine 200, a motor generator MG1, and a motor generator MG2 described later. The control units operate in accordance with respective control programs set in advance, and control an operating state of the hybrid vehicle 1 in cooperation with each other, as occasion demands, together with another control unit not illustrated. In the engine brake control process described later, the power control unit 120 controls engine brake of the hybrid vehicle 1 in cooperation with the clutch control unit 110. Such a configuration of the ECU 100, however, is merely one example, and any configuration of a control system can be used as long as an action associated with the hybrid vehicle control apparatus according to the present invention can be realized.

The PCU 11 includes a not-illustrated inverter configured to convert direct-current (DC) power extracted from the battery 12 to alternating-current (AC) power and supply it to the motor generator MG1 and the motor generator MG2 described later, and configured to convert AC power generated by the motor generator MG1 and the motor generator MG2 to DC power and supply it to the battery 12. The PCU 11 is a control unit configured to control the input/output of electric power between the battery 12 and each motor generator, or the input/output of electric power between the motor generators. The PCU 11 is electrically connected to the power control unit 120 of the ECU 100, and the operation of the PCU 11 is controlled by the power control unit 120.

The battery 12 is a chargeable storage battery device as one example of the "power supply" according to the present invention, which functions as an electric power supply associated with electric power for performing power running of the motor generator MG1 and the motor generator MG2. The battery 12 has, for example, such a configuration that several hundreds of secondary battery unit cells with an output voltage of several volts (V) are connected in series.

The vehicle speed sensor 13 is a sensor configured to detect a vehicle speed V of the hybrid vehicle 1. The vehicle speed sensor 13 is electrically connected to the ECU 100, and the detected vehicle speed V is referred to by the ECU 100 as occasion demands.

The accelerator opening sensor 14 is a sensor configured to detect an accelerator opening degree Ta, which is a manipulated variable or operation amount of a not-illustrated accelerator pedal of the hybrid vehicle 1. The accelerator opening sensor 14 is electrically connected to the ECU 100, and the detected accelerator opening degree Ta is referred to by the ECU 100 as occasion demands.

The temperature sensor 15 is a sensor configured to detect battery temperature Tbatt, which is temperature of the battery 12. The temperature sensor 15 is electrically connected to the ECU 100, and the detected battery temperature Tbatt is referred to by the ECU 100 as occasion demands.

The SOC sensor 16 is a sensor configured to detect state of charge (SOC), which represents a power storage amount of the battery 12. The SOC sensor 16 is electrically connected to the ECU 100, and the detected SOC is referred to by the ECU 100 as occasion demands. The SOC is an index value in which the power storage amount of the battery 12 is standardized with a complete discharge state as 0(%), and with a full charge state as 100(%).

The hybrid drive apparatus 10 is a power train of the hybrid vehicle 1. The hybrid drive apparatus 10 is configured to transmit power supplied from the engine 200, and the motor generators MG1 and MG2 described later, to an axle VS coupled with drive wheels DW.

Figure 2:
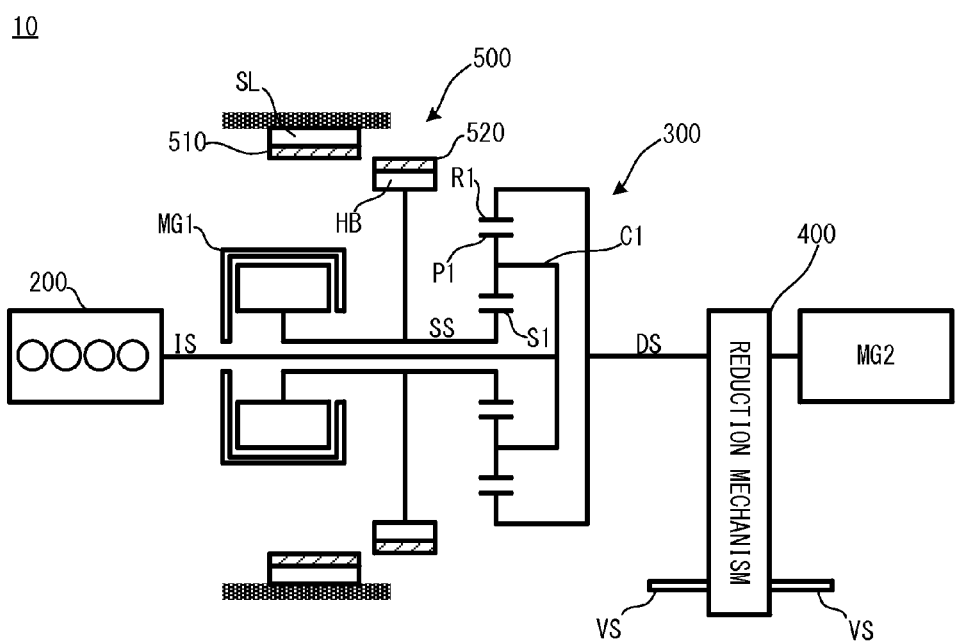
FIG. 2 is a schematic configuration diagram conceptually illustrating a configuration of a hybrid drive apparatus in the hybrid vehicle in FIG. 1.

Now with reference to FIG. 2, a detailed configuration of the hybrid drive apparatus 10 will be explained. FIG. 2 is a schematic configuration diagram conceptually illustrating the configuration of the hybrid drive apparatus 10. In FIG. 2, the same parts as those in FIG. 1 will carry the same reference numeral, and the explanation thereof will be omitted as occasion demands.

In FIG. 2, the hybrid drive apparatus 10 is provided with the engine 200, a power dividing mechanism 300, the motor generator MG1, the motor generator MG2, a reduction mechanism 400, and a dog clutch mechanism 500.

The engine 200 is a gasoline engine, which is one example of the "engine" according to the present invention, and is configured to function as one power source of the hybrid vehicle 1. Engine torque Te, which is output power of the engine 200, is inputted to an input shaft IS of the hybrid drive apparatus 10 via a not-illustrated crankshaft.

The "engine" of the present invention is a concept that includes an engine configured to change thermal energy associated with combustion of fuel into kinetic energy and extract it. As long as the concept can be satisfied, the configuration of the engine according to the present invention may have various aspects, regardless of whether or not the configuration is known.

Back to FIG. 2, the motor generator MG1 is a motor generator, which is one example of the "first electrical rotating machine" according to the present invention, and includes a power running function for converting electric energy into kinetic energy and a regenerative function for converting kinetic energy into electric energy.

The motor generator MG2 is a motor generator, which is one example of the "second electrical rotating machine" according to the present invention. As in the motor generator MG1, the motor generator MG2 includes the power running function for converting electric energy into kinetic energy and the regenerative function for converting kinetic energy into electric energy. Each of the motor generators MG1 and MG2 is configured, for example, as a three-phase synchronous motor generator, and is provided, for example, with a rotor having a plurality of permanent magnets on an outer circumferential surface, and a stator around which a three-phase coil for forming a rotating magnetic field is wound. The motor generators, however, may have another configuration.

The power dividing mechanism 300 is a planetary gear mechanism, which is one example of the "differential mechanism" according to the present invention, provided with a sun gear S1 disposed in a central part, a ring gear R1 concentrically disposed on an outer circumference of the sun gear S1, a plurality of pinion gears P1 disposed between the sun gear S1 and the ring gear R1, wherein the pinion gears P1 revolve while rotating on the outer circumference of the sun gear S1, and a planetary carrier C1 pivotally supporting rotating shafts of the respective pinion gears. Each of the rotating elements, which are the sun gear S1, the ring gear R1 and the planetary carrier C1, respectively function as differential elements of the power dividing mechanism 300.

The sun gear S1 is coupled with the motor generator MG1 via a sun gear shaft SS, and the number of revolutions thereof is equivalent to number of MG1 revolutions Ng, which is the number of revolutions of the motor generator MG1.

The ring gear R1 is coupled with the axle VS via the reduction mechanism 400 including various reduction gears, such as a drive shaft DS and a differential gear. Thus, number of revolutions of the ring gear R1 and number of drive shaft revolutions Nds, which is the number of revolutions of the drive shaft DS, take unique values with respect to the vehicle speed V. Since the motor generator MG2 is also coupled with the drive shaft DS, the number of drive shaft revolutions Nds is also equivalent to number of MG2 revolutions Nm, which is the number of revolutions of the motor generator MG2. Necessarily, the number of MG2 revolutions Nm also takes a unique value with respect to the vehicle speed V.

Here, the motor generator MG2 is directly coupled with the drive shaft DS; however, a transmission apparatus and a reduction apparatus may be also installed between the drive shaft DS and the motor generator MG2.

The planetary carrier C1 is coupled with the aforementioned input shaft IS. Therefore, the number of revolutions of the planetary carrier C1 is equivalent to number of engine revolutions Ne.

The power dividing mechanism 300 is configured to distribute the engine torque Te to the sun gear S1 and the ring gear R1 via the planetary carrier C1 and the pinion gears P1 at a predetermined ratio (or a ratio according to a gear ratio between the respective gears) under such a configuration.

At this time, if, in order to make it easy to understand the operation of the power diving mechanism 300, a gear ratio ρ is defined as the number of teeth of the sun gear S1 to the number of teeth of the ring gear R1, then, sun gear shaft torque Tes acting on the sun gear S1 when the engine torque Te is allowed to act on the planetary carrier C1 from the engine 200 can be expressed by the following equation (1), and drive shaft transmission torque Tep that appears on the drive shaft DS can be expressed by the following equation (2).

$$Tes=Te\times\rho/(1+\rho) \quad (1)$$

$$Tep=Te\times 1/(1+\rho) \quad (2)$$

The dog clutch mechanism 500 is a rotary meshing type clutch apparatus, which is one example of the "engagement mechanism" according to the present invention, provided with a plurality of engaging elements and configured in such a manner that the plurality of engaging elements can engage with or can be disengaged or released from each other.

The dog clutch mechanism 500 is provided, as a pair of engaging elements, with an annular sleeve SL and a hub HB, wherein the annular sleeve SL is fixed in a relatively non-rotatable manner with respect to a fixed element such as, for example, a chassis and a transmission case, and the hub HB is fixed on the sun gear SS and rotates integrally with the sun gear shaft SS. The sleeve SL and the hub HB are coaxially arranged with each other. Moreover, rectangular dog teeth 510 are formed at equal intervals on an inner circumferential surface of the sleeve SL, and rectangular dog teeth 520 are formed at equal intervals on an outer circumferential surface of the hub HB.

The sleeve SL can be stroked by a predetermined amount in an axial direction by a not-illustrated actuator that is driven and controlled by the clutch control unit 110 of the ECU 100. If a stroke amount of the sleeve SL reaches a predetermined engagement stroke amount, the dog teeth 510 formed on the sleeve SL and the dog teeth 520 formed on the hub HB mesh with each other to set the dog clutch mechanism 500 in an engaged state. In the engaged state, the hub HB is fixed to the fixed element via the sleeve SL, and the sun gear shaft SS is thus locked to be non-rotatable. Necessarily, the motor generator MG1 becomes in a non-rotatable, locked state (i.e. corresponding to the number of MG1 revolutions Ng=0).

If, however, the stroke amount does not reach the engagement stroke amount, the dog teeth are disengaged from each other, and the dog clutch mechanism 500 becomes in a disengaged state. In the disengaged state, the hub HB is not fixed to the fixed element via the sleeve SL, and the sun gear shaft SS thus can rotate. Necessarily, the motor generator MG1 also can rotate.

The dog clutch mechanism 500 is one example of the "engagement mechanism" according to the present invention. The configuration of the engagement mechanism according to the present invention, however, is not limited to this type of meshing type engagement apparatus.

<Operation of Embodiment>
<Outline of Transmission Mode>

The hybrid vehicle 1 has a continuously variable transmission (CVT) mode and a fixed transmission mode, as a transmission mode for defining a transmission gear ratio, which is a ratio between the number of engine revolutions Ne and the number of drive shaft revolutions Nds, which is the number of revolutions of the drive shaft DS (i.e. having a unique relation with the vehicle speed V). The former is a transmission mode when the dog clutch mechanism 500 is in the disengaged state, and the latter is a transmission mode when the dog clutch mechanism 500 is in the engaged state.

Figure 3:
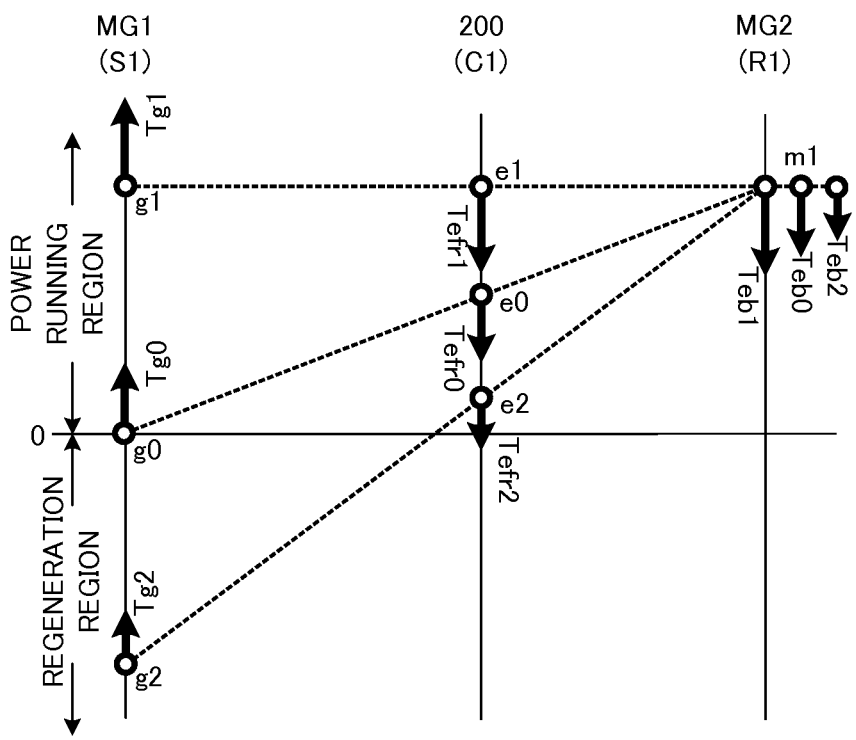
FIG. 3 is an operating nomogram of the hybrid drive apparatus in FIG. 2.

Now, with reference to FIG. 3, the transmission mode will be explained. FIG. 3 is an operating nomogram of the hybrid drive apparatus. In FIG. 3, the same parts as those in FIG. 2 will carry the same reference numeral, and the explanation thereof will be omitted as occasion demands.

In FIG. 3, the operating nomogram is a chart illustrating a relation between the number of revolutions (on vertical axis) and the torque, regarding the three elements, which are the motor generator MG1 (or uniquely the sun gear S1), the engine 200 (or uniquely the planetary carrier C1), and the motor generator MG2 (or uniquely the ring gear R1 and the drive shaft DS).

The power dividing mechanism 300 is a differential mechanism with two rotational degrees of freedom established by three rotating elements that are in a differential relation with each other, and is configured in such a manner that if the numbers of revolutions of two of the three elements are determined, the number of revolutions of the remaining one rotating element is necessarily determined. In other words, in the operating nomogram, the relation in the number of revolutions between the three elements can be expressed by one operating collinear line (refer to a dashed line) corresponding to an operating state of the hybrid drive apparatus 10 in a one-to-one manner.

In the CVT mode, in order to supply the aforementioned drive shaft transmission torque Tep to the drive shaft DS, it is necessary to output, from the motor generator MG1, reaction torque having a same absolute value as that of the aforementioned sun gear shaft torque Tes and having an inverted sign (which is negative torque as the engine torque is positive torque in this case.

In FIG. 3, it is assumed that an operating point of the motor generator MG2 is an illustrated operating point m1. In this case, if an operating point of the motor generator MG1 is an illustrated operating point g1 (Ng>0), an operating point of the engine 200 coupled with the carrier C1, which is the remaining rotating element, is an illustrated operating point e1. For convenience, under the assumption that the number of revolutions of the ring gear R1 is constant, if the operating point of the motor generator MG1 is changed to an illustrated operating point g0 (Ng=0) and an illustrated operating point g2 (Ng<0), the operating point of the engine 200 is also respectively changed to an illustrated operating point e0 and an illustrated operating point e2. As described above, in the CVT mode, the number of engine revolutions Ne can be freely changed by the motor generator MG1, and the transmission gear ratio can be continuously changed.

In contrast, if the dog clutch mechanism 500 becomes in the engaged state and if the motor generator MG1 is locked to be non-rotatable, the operating point of the motor generator MG1 is fixed at the illustrated operating point g0. In this case, from the number of MG1 revolutions Ng (Ng=0) and the number of MG2 revolutions Nm (i.e. the number of drive shaft revolutions Nds), which is unique to the vehicle V, the remaining number of engine revolutions Ne can be uniquely determined (refer to the illustrated operating point e0). In other words, the transmission gear ratio becomes constant in the fixed transmission mode.

In the fixed transmission mode, the degree of freedom in the number of engine revolutions Ne with respect to the vehicle speed V is lost, whereas the dog clutch mechanism 500 can receive or bear the reaction torque countering the sun gear shaft torque Tes. It is therefore possible to prevent power circulation. It is also possible to set the motor generator MG1 to be in a shutdown state in which switching drive of the inverter is stopped. Energy efficiency of the hybrid vehicle 1 can be improved by reducing electrical loss.

<Outline of Engine Brake Control>

In the hybrid vehicle 1, if coasting deceleration traveling is required, such as during accelerator-off, engine brake torque Teb using rotational resistance of the engine 200 is supplied to the drive shaft DS. Now, with reference to FIG. 3 again, the engine brake torque Teb will be explained.

The engine brake torque Teb is negative torque obtained by substituting, instead of the engine torque Te, engine friction torque Tefr (Tefr<0) in the above equation (2) representing the drive shaft transmission torque Tep. The engine friction torque Tefr is torque corresponding to the rotational resistance (which alternatively may be expressed as rotational inertia) of the engine 200 in a fuel-cut state. The engine friction torque Tefr increases with increasing the number of engine revolutions Ne.

In FIG. 3, if engine friction torques Tefr1, Tefr0, and Tefr2 respectively corresponding to the operating points e1, e0, and e2 are defined, magnification relations of absolute values thereof are Tefr1>Tefr0>Teft2. Necessarily, magnification relations of absolute values of engine brake torques Teb1, Teb0, and Teb2 acting on the drive shaft DS and respectively corresponding to the engine friction torques Tefr1, Tefr0, and Tefr2 are Teb1>Teb0>Teb2.

In the CVT mode, if the engine brake torque Teb corresponding to the engine friction torque Tefr is allowed to act on the drive shaft DS, reaction torque (i.e. positive torque in this case) to negative torque is supplied from the motor generator MG1, wherein the negative torque is obtained by substituting, instead of the engine torque Te, the engine friction torque Tefr in the above equation (1) representing the sun gear shaft torque Tes. FIG. 3 illustrates MG1 torques Tg1, Tg0, and Tg2 respectively corresponding to the engine friction torques Tefr1, Tefr0, and Tefr2.

For example, if engine brake required torque Tebn, which is a required value of the engine brake torque Teb to act on the drive shaft DS, is the aforementioned Teb1, the MG1 torque Tg1 (Tg1>0) is outputted from the motor generator MG1. At this time, the number of engine revolutions Ne increases or decreases to a value at which the MG1 torque Tg1 and the engine friction torque Tefr balance out, and the operating point of the engine 200 converges to the illustrated operating point e1 at which the engine friction torque Tefr1 balancing with the MG1 torque Tg1 is obtained.

In the same manner, if the engine brake required torque Tebn is the aforementioned Teb0, the MG1 torque Tg0 (Tg0>0) is outputted from the motor generator MG1. The number of engine revolutions Ne increases or decreases to a value at which the MG1 torque Tg0 and the engine friction torque Tefr balance out, and the operating point of the engine 200 converges to the illustrated operating point e0 at which the engine friction torque Tefr0 balancing with the MG1 torque Tg0 is obtained.

In the same manner, if the engine brake required torque Tebn is the aforementioned Teb2, the MG1 torque Tg2 (Tg2>0) is outputted from the motor generator MG1. The number of engine revolutions Ne increases or decreases to a value at which the MG1 torque Tg2 and the engine friction torque Tefr balance out, and the operating point of the engine 200 converges to the illustrated operating point e0 at which the engine friction torque Tefr2 balancing with the MG1 torque Tg2 is obtained.

In the embodiment, the engine brake control by the MG1 torque Tg as described above is referred to as "first control". The first control is one example of the "first control" according to the present invention.

By the way, the MG1 torque Tg in the first control is always positive torque. In the number of MG1 revolutions Ng, however, the sign thereof is inverted at the illustrated operating point g0 at which Ng=0; it is, for example, positive rotation at the illustrated operating point g1 and negative rotation at the illustrated operating point g2. Therefore, the motor generator MG1 is in a power running state with positive rotation and positive torque in a positive rotation region (refer to a "power running region" illustrated), and is a regenerative state with negative rotation and positive torque in a negative rotation region (refer to a "regeneration region" illustrated).

At the illustrated operating point g0, the number of MG1 revolutions Ng=0, so that the motor generator MG1 does not work externally. In this state, energy loss Ploss, which includes electrical loss between an electric power input/output path between the battery 12 and the motor generator MG1 and mechanical loss in a power transmission path from the drive shaft DS to the motor generator MG1, balances with engine brake output Peb0 based on the drive shaft, which is defined by the engine brake torque Teb0 and the number of drive shaft revolutions Nds. Hereinafter, this state will be expressed as a "state of equilibrium", as occasion demands.

Here, in particular, power-running drive of the motor generator MG1 is accompanied by discharge from the battery 12, and regenerative drive is accompanied by charge of the battery 12. For the battery 12, there are set a discharge limit value Wout representing an upper limit of dischargeable electric power and a charge limit value Win representing an upper limit of chargeable electric power. Power-running power is rate-limited by the discharge limit value Wout, and regenerative power is rate-limited by the charge limit value Win. The power-running power and the regenerative power are directly connected to the engine brake torque Teb. Therefore, if this type of rate-limiting occurs, the engine brake torque Teb in the first control is insufficient for the engine brake required torque Tebn, and deceleration of the hybrid vehicle 1 likely becomes insufficient.

In order to cope with such a problem, the hybrid vehicle 1 has, as the engine brake control, second control and third control prepared in addition to the aforementioned first control, and the controls are selectively performed by the engine brake control process performed by the power control unit 120. The second control and the third control will be described later.

Now, with reference to FIG. 4, the engine brake control in the hybrid vehicle 1 will be explained. FIG. 4 is a table explaining a correspondence relation between the engine brake required torque and types of the engine brake control. In FIG. 4, the same parts as those in FIG. 3 will carry the same reference numeral, and the explanation thereof will be omitted as occasion demands.

Firstly, in the embodiment, as a term for defining the magnitude of the engine brake required torque Tebn, terms of "small", "medium", and "large" are used for convenience. The large, medium, and small engine brake required torques Tebn respectively correspond to large, medium, and small absolute values. The engine brake required torque Tebn is negative torque, and thus, in magnification relations of the numerical values including positive and negative signs, the large, medium, and small engine brake required torques Tebn respectively correspond to small, medium, and large numerical values.

The magnitude of the engine brake required torque, i.e. large, medium, and small, is a relative concept defined on the basis of the engine brake torque Teb0 in the case of the number of MG1 revolutions Ng=0, as described below. The engine brake torque Teb0 in the case of the number of MG1 revolutions N=0 is a variable value varying depending on the vehicle speed V, in terms of the configuration of the power dividing mechanism 300. Therefore, the magnitude of the engine brake required torque, i.e. large, medium, and small, does not always have a unique relation with the magnitude of the absolute value of the engine brake required torque Tebn.

A case where the engine brake required torque is "small" means a case where a relation of "Tebn>Teb0" holds for the engine brake required torque Tebn, on the basis of the engine brake torque Teb0 acting on the drive shaft DS in the case of the number of MG1 revolutions Ng=0 described above. In the same manner, a case where the engine brake required torque is "medium" means a case where a relation of "Tebn=Teb0" holds for the engine brake required torque Tebn. A case where the engine brake required torque is "large" means a case where a relation of "Tebn<Teb0" holds for the engine brake required torque Tebn.

In other words, the case of the small engine brake required torque means that the operating point of the motor generator MG1 belongs to the regeneration region in FIG. 3, and the case of the large engine brake required torque means that the operating point of the motor generator MG1 belongs to the power running region in FIG. 3.

In the embodiment, the case of the "medium" engine brake required torque is defined as "Tebn=Teb0"; however, and it may be also defined as "Tebn≈Teb0" on a practical operational side, with a certain degree of error range or allowable range included. In this case, upper and lower limits of the range may be also set in such a manner that a difference between the required torque and actual torque (i.e. |Tebn−Te0| in this case) cannot be perceived by a driver, for example, experimentally, experientially, or theoretically in advance.

In FIG. 4, a part described as "reference control" means engine brake control in a case where the hybrid vehicle 1 performs electric vehicle (EV) traveling in which the engine 200 is stopped.

During the EV traveling, the engine 200 is stopped; however, the motor generator MG1 is already in the shutdown state because there is no need to receive or bear the reaction torque of the engine torque Te during the EV traveling, as opposed to a case where the engine 200 is temporarily stopped in the first control described above. Thus, the engine friction torque Tefr is consumed only by an increase in the rotation of the motor generator MG1 on a free rotation side, and the engine brake torque according to the engine friction torque Tefr does not act on the drive shaft DS. In other words, it is practically only the motor generator MG2 that can apply braking torque to the drive shaft DS during the EV traveling.

Therefore, if the engine brake is required during the EV traveling, MG2 torque Tm, which is output torque of the motor generator MG2, is controlled according to the engine brake required torque Tebn. The MG2 torque Tm in this case is regenerative torque, and regenerative power varies depending on the magnitude of the engine brake required torque Tebn.

FIG. 4 illustrates, on the right of the reference control, the engine brake control during traveling in the CVT mode, in order of the first control, the third control, and the second control.

The first control described above includes each of a mode A, a mode D, and a mode F according to the engine brake required torque Tebn. The modes A, D, and F respectively correspond to the cases where the engine brake required torque Tebn is small, medium, and large. The first control is control in which the engine brake required torque Teb is covered only by the motor generator MG1. Thus, in the mode A in which the number of MG1 revolutions Ng<0, the motor generator MG1 is in the regenerative state. In the same manner, in the mode D in which the number of MG1 revolutions Ng=0, the motor generator MG1 is in the state of equilibrium described above. In the same manner, in the mode F in which number of MG1 revolutions Ng>0, the motor generator MG1 is in the power running state.

The second control includes each of a mode C, a mode E, and a mode H according to the engine brake required torque Tebn. The modes C, E, and H respectively correspond to the cases where the engine brake required torque Tebn is small, medium, and large.

Now, with reference to FIG. 3 again, the details of the second control will be explained.

The second control is control in which the transmission mode is controlled to be the fixed transmission mode and in which excess and deficiency of the engine brake torque Teb against the engine brake required torque Tebn is compensated by the MG2 torque Tm. The second control is one example of the "second control" according to the present invention.

In FIG. 3, it is assumed that the engine brake required torque Tebn is Teb2 (Teb2>Teb0), as one example of the case where the engine brake required torque Tebn is small.

If the motor generator MG1 is locked with the dog clutch mechanism 500 set in the engaged state, the number of MG1 revolutions=0, and thus, the engine brake torque Teb acting on the drive shaft DS becomes Teb0. Therefore, in this case, a difference between the engine brake torque Teb and the engine brake required torque Tebn is Teb0−Teb2<0. This means that the engine brake torque is excessive for the required torque because torque balance is negative.

Thus, if the engine brake required torque Tebn is small, the motor generator MG2 is power-driven in the second control, and positive torque for canceling the excessive engine brake torque (i.e. in this case, Teb2−Teb0>0) is outputted from the motor generator MG2. A mode corresponding to this control aspect is the mode C in the second control.

In FIG. 3, it is assumed that the engine brake required torque Tebn is Teb1 (Teb1<Teb0), as one example of the case where the engine brake required torque Tebn is large.

If the motor generator MG1 is locked with the dog clutch mechanism 500 set in the engaged state, the number of MG1 revolutions=0, and thus, the engine brake torque Teb acting on the drive shaft DS becomes Teb0. Therefore, in this case, the difference between the engine brake torque Teb and the engine brake required torque Tebn is Teb0−Teb1>0. This means that the engine brake torque is insufficient for the required torque because the torque balance is positive.

Thus, if the engine brake required torque Tebn is large, the motor generator MG2 is regeneratively driven in the second control, and negative torque for compensating the insufficient engine brake torque (i.e. in this case, Teb1−Teb0<0) is compensated by the regenerative torque of the motor generator MG2. A mode corresponding to this control aspect is the mode H in the second control.

In FIG. 3, it is assumed that the engine brake required torque Tebn is medium (i.e. Tebn=Teb0).

If the motor generator MG1 is locked with the dog clutch mechanism 500 set in the engaged state, the number of MG1 revolutions=0, and thus, the engine brake torque Teb acting on the drive shaft DS becomes Teb0. Therefore, in this case, the difference between the engine brake torque Teb and the engine brake required torque Tebn is Teb0−Tebn=0. This means that the engine brake torque is zero (or substantially zero if the aforementioned range is set).

Thus, if the engine brake required torque Tebn is medium, the torque adjustment by the motor generator MG2 is not performed in the second control. In this case, power consumption is only lock holding power required to hold the lock state of the motor generator MG1. A mode corresponding to this control aspect is the mode E in the second control.

Subsequently, with reference to FIG. 3, the details of the third control will be explained.

The third control includes the mode B, the mode D, and the mode G. The modes B, D, and G respectively correspond to the cases where the engine brake required torque Tebn is small, medium, and large.

In FIG. 3, it is assumed that the engine brake required torque Tebn is Teb2 (Teb2>Teb0), as one example of the case where the engine brake required torque Tebn is small. In this case, as described above, in the first control, the operating point of the motor generator MG1 is in the regeneration region, and the motor generator MG1 is regeneratively driven.

In the third control, however, the motor generator MG1 is controlled in such a manner that power input/output characteristics of the motor generator MG1 are reversed from those in the first control. In other words, if the engine brake required torque is small, the motor generator MG1 is power-driven.

Now, it is assumed that the operating point of the motor generator MG1 is controlled to be the illustrated operating point g1, as one example of the case where the motor generator MG1 is power-driven. In this case, as described above, the engine brake torque Teb is Teb1, and the difference between the engine brake torque Teb and the engine brake required torque Tebn is Teb1−Teb2<0. This means that the engine brake torque is excessive for the required torque because the torque balance is negative.

Thus, if the engine brake required torque Tebn is small, the motor generator MG2 is power-driven in the third control, and positive torque for canceling the excessive engine brake torque (i.e. in this case, Teb2−Teb1>0) is outputted from the motor generator MG2. A mode corresponding to this control aspect is the mode B in the third control.

Moreover, it is assumed that the engine brake required torque Tebn is Teb1 (Teb1<Teb0), as one example of the case where the engine brake required torque Tebn is large. In this case, as described above, in the first control, the operating point of the motor generator MG1 is in the power-running region, and the motor generator MG1 is power-driven.

In the third control, however, the motor generator MG1 is controlled in such a manner that the power input/output characteristics of the motor generator MG1 are reversed from those in the first control. In other words, if the engine brake required torque is large, the motor generator MG1 is regeneratively driven.

Now, it is assumed that the operating point of the motor generator MG1 is controlled to be the illustrated operating point g2, as one example of the case where the motor generator MG1 is regeneratively driven. In this case, as described above, the engine brake torque Teb is Teb2, and the difference between the engine brake torque Teb and the engine brake required torque Tebn is Teb2−Teb1>0. This means that the engine brake torque is insufficient for the required torque because the torque balance is positive.

Thus, if the engine brake required torque Tebn is large, the motor generator MG2 is regeneratively driven in the third control, and negative torque for compensating the insufficient engine brake torque (i.e. in this case, Teb1−Teb2<0) is compensated by the regenerative torque of the motor generator MG2. A mode corresponding to this control aspect is the mode G in the third control.

As described above, in the modes B and G in the third control, the power input/output characteristics of the motor generator MG2 are also reversed from the power input/output characteristics of the motor generator MG1 in the first control.

If the engine brake required torque Tebn is medium, the third control is the same control as the first control. In other words, the mode D can be applied even in the third control, and the engine brake torque Teb is covered only by the motor generator MG1.

As described above, in the third control, both the motor generator MG1 and the motor generator MG2 are controlled in such a manner that the engine brake required torque Tebn is satisfied. In particular, the motor generator MG1 and the motor generator MG2 are controlled in such a manner that the power input/output characteristics are reversed from those in the first control. In other words, if the motor generator MG1 is regeneratively driven in the first control, the motor generators MG1 and MG2 are both power-driven in the third control. In contrast, if the motor generator MG1 is power-driven in the first control, the motor generators MG1 and MG2 are both regeneratively driven in the third control.

<Details of Engine Brake Control Process>

Figure 5:
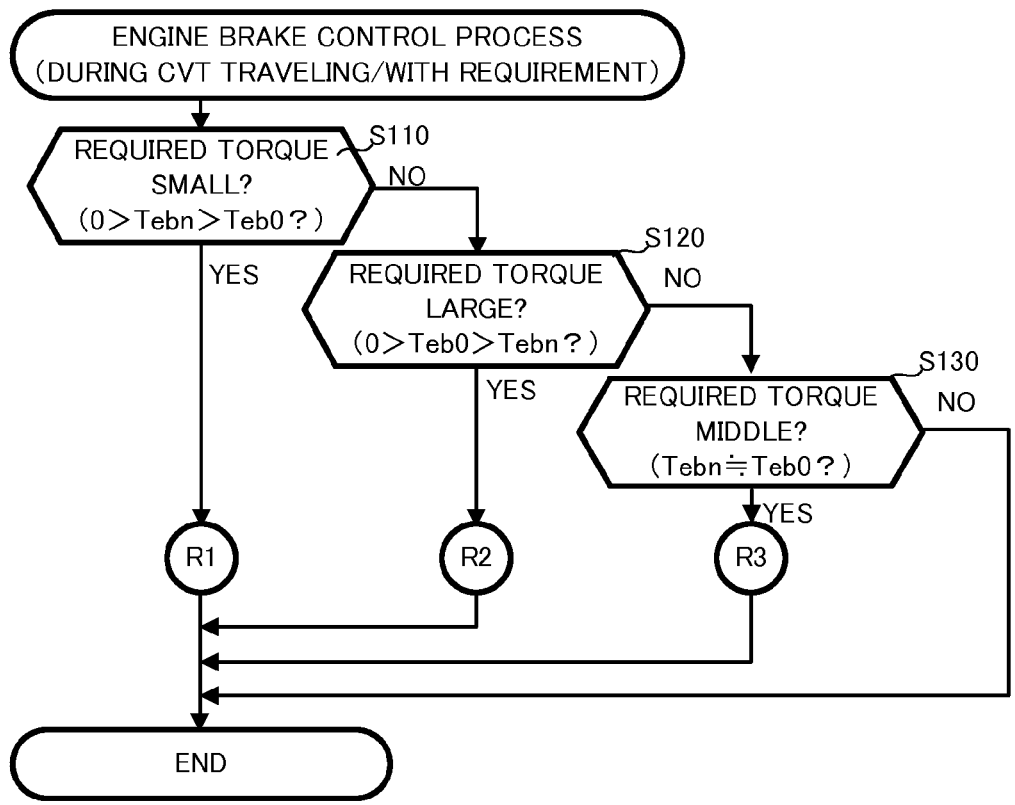
FIG. 5 is a flowchart illustrating an engine brake control process.

Next, with reference to FIG. 5, the details of the engine brake control process will be explained. FIG. 5 is a flowchart illustrating the engine brake control process. FIG. 5 illustrates control performed if an engine brake requiring operation such as an accelerator-off operation is performed during traveling in the CVT mode.

In FIG. 5, firstly, it is determined whether or not the engine brake required torque Tebn is small (step S110). In other words, it is determined whether or not a condition of Tebn>Teb0 is satisfied.

Here, the engine brake required torque Tebn is set in a control map in advance by using the vehicle speed V as a parameter. A value according to the vehicle speed V at a time point of the accelerator-off operation is read from the control map, and is set as the engine brake required torque Tebn.

Moreover, the engine brake torque Teb0 is engine brake torque obtained in the case of Ng=0, as already explained. The number of engine revolutions Ne in the case of the number of MG1 revolutions Ng=0 (i.e. the engine friction torque Tefr) is uniquely determined according to the vehicle speed V. Thus, as in the engine brake required torque Tebn, Teb0 is also uniquely determined according to the vehicle speed V.

If the engine brake required torque Tebn is small (the step S110: YES), the process is moved to a sub routine R1. If appropriate engine brake control is selected by the sub routine R1, the engine brake control process is ended. The sub routine R1 will be described later.

If the engine brake required torque Tebn is not small (the step S110: NO), it is determined whether or not the engine brake required torque Tebn is large (step S120). In other words, it is determined whether or not a condition of Tebn<Teb0 is satisfied. If the engine brake required torque Tebn is large (the step S120: YES), the process is moved to a sub routine R2. If appropriate engine brake control is selected by the sub routine R2, the engine brake control process is ended. The sub routine R2 will be described later.

If the engine brake required torque Tebn is not small and is not large (the step S120: NO), it is determined whether or not the engine brake required torque Tebn is medium (step S130). In other words, it is determined whether or not a condition of Tebn=Teb0 is satisfied.

If the engine brake required torque Tebn is medium (the step S130: YES), the process is moved to a sub routine R3. If appropriate engine brake control is selected by the sub routine R3, the engine brake control process is ended. The sub routine R3 will be described later.

If the engine brake required torque Tebn does not correspond to any of large, medium, and small (the step S130: NO), there is likely erroneous determination of the engine brake requirement, so that the engine brake control process is ended.

Figure 6:
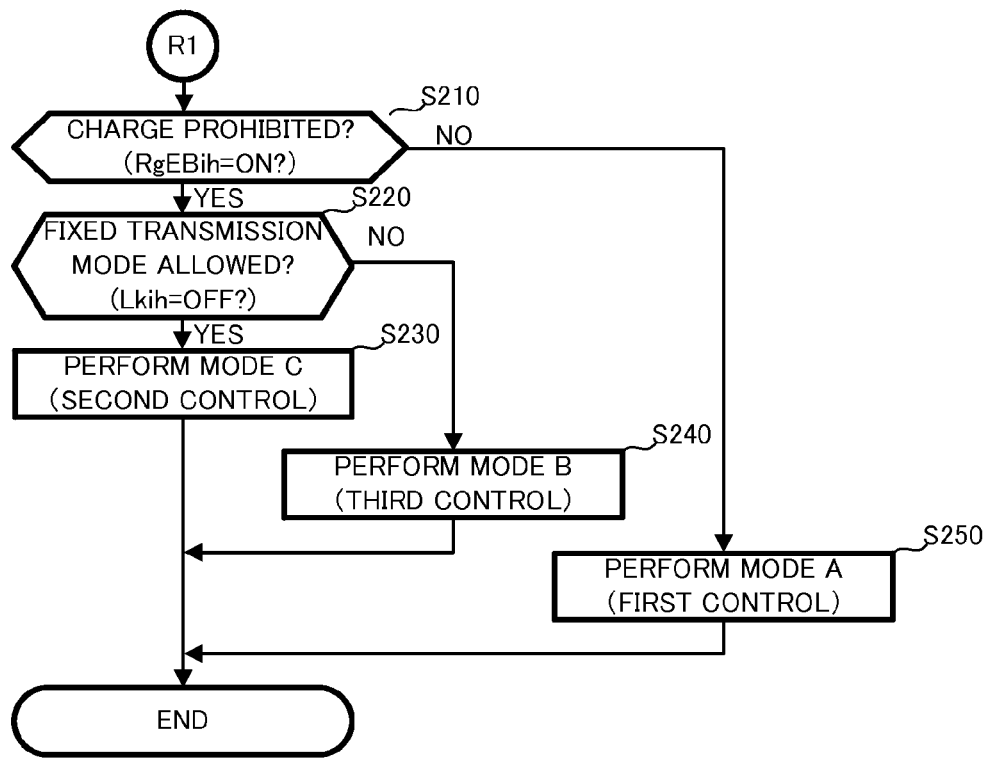
FIG. 6 is a flowchart illustrating a sub routine R1.

Next, with reference to FIG. 6, the sub routine R1 will be explained. FIG. 6 is a flowchart illustrating the sub routine R1.

In FIG. 6, firstly, it is determined whether or not the battery 12 is in a charge prohibited state (step S210).

Whether or not the battery 12 is in the charge prohibited state is determined on the basis of a charge prohibition flag RgEBih. The charge prohibition flag RgEBih is a control flag that is set to "ON" if the battery 12 is in the charge prohibited state and that is set to "OFF" if the battery 12 is not in the charge prohibited state. The charge prohibition flag RgEBih is set by a charge prohibition flag setting process, which is performed by the power control unit 120 in parallel with the engine brake control process.

Figure 7:
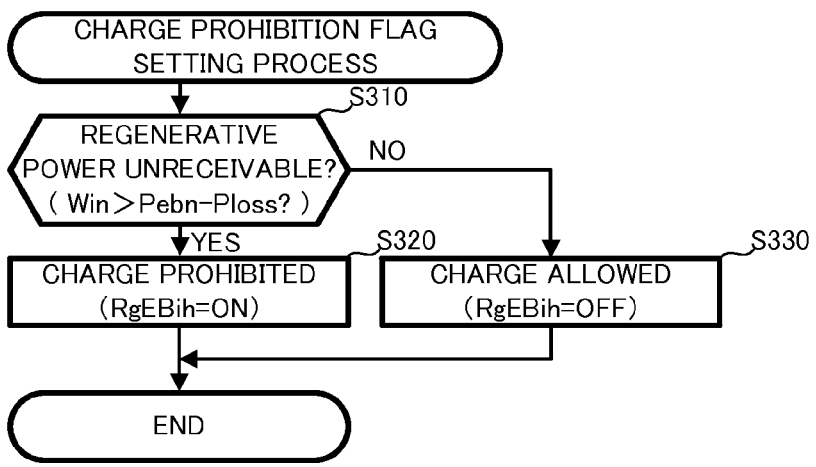
FIG. 7 is a flowchart illustrating a charge prohibition flag setting process.

Now, with reference to FIG. 7, the charge prohibition flag setting process will be explained. FIG. 7 is a flowchart illustrating the charge prohibition flag setting process.

In FIG. 7, firstly, it is determined whether or not the battery 12 is regenerative-power unreceivable (step S310). Specifically, it is determined whether or not the following equation (3) holds.

$$\text{Win} > \text{Pin} \quad (3)$$

Here, Win is the charge limit value of the battery 12. The charge limit value Win is determined, always with fluctuations, by another control unit that monitors a state of the battery 12. The charge limit value Win is determined mainly from the battery temperature Tbatt and the SOC of the battery 12. Since Win is a negative value, the step S310 is equivalent to whether or not |Win|<Pebn−Ploss is satisfied.

A method of setting the charge limit value Win is known, and the explanation thereof will be thus omitted. The charge limit value Win has an absolute value that decreases in a binary or stepwise manner with respect to a reference value if the battery temperature Tbatt is greater than or equal to an upper limit or less than or equal to a lower limit. This is because a charging performance of the battery 12 relatively decreases at high temperature and low temperature.

Moreover, the charge limit value Win has an absolute value that decreases in a binary or stepwise manner with respect to the reference value as the SOC approaches a maximum value in control (e.g. SOC=80 to 90%). Moreover, if the SOC reaches the maximum value in control, Win=0. This is because the battery 12 does not have room to receive electric power with increasing the SOC. Moreover, the detection of the SOC by the SOC sensor 16 has a time lag with respect to a change in the actual SOC. Therefore, the charge limit value Win is set to Win=0 at a time point at which the SOC reaches the maximum value in control, and the charging is prohibited. Such an aspect of setting the change limit value Win is one example. Practical benefits according to the present invention are received regardless of how to set the charge limit value Win.

In the case of Win=0, the battery 12 is in the charge prohibited state in a strict meaning. The "charge prohibition" according to the change prohibition flag setting process, however, not only includes what is determined only by such a state of the battery 12 but also is determined by a relative relation between the change limit value Win and the regenerative power generated with the engine brake control.

In the above equation (3), Pin is a regenerative power value when the engine brake required torque Tebn is allowed to act on the drive shaft DS, and is calculated on the basis of the following equation (4).

$$\text{Pin} = \text{Pebn} - \text{Ploss} \quad (4)$$

In the above equation (4), Ploss is the energy loss described above, and Pebn is engine brake required output.

The engine brake required output Pebn is electric power generated on the drive shaft DS if the engine brake required torque Tebn is allowed to act on the drive shaft DS, and is calculated on the basis of the engine brake required torque Tebn and the number of drive shaft revolutions Nds. Since the charge limit value Win is a negative value, the above equation (3) has a reversed sign of inequality on the basis of the absolute value.

If the battery 12 is regenerative-power unreceivable (the step S310: YES), the charge prohibition flag RgEBih is set to ON, and the engine brake control accompanied by the charging to the battery 12 is prohibited (S320). If the battery 12 is regenerative-power receivable (the step S310: NO), the charge prohibition flag RgEBih is set to OFF, and the engine brake control accompanied by the charging to the battery 12 is allowed (S330).

The above equation (3) does not hold if Win=0 and Pebn−Ploss=0. In the case of Win=0, however, any regenerative power cannot be received, and the step S310 thus branches to the YES side.

If the charge prohibition flag RgEBih is set to any value, the charge prohibition flag setting process is ended. The charge prohibition flag setting process is repeatedly performed with a predetermined period.

Back in FIG. 6, if the battery 12 is not in the charge prohibited state (the step S210: NO), the first control is selected, and the engine brake required torque is small. Thus, the engine brake control according to the mode A described above is performed (step S250). In other words, the engine brake required output Pebn is covered by the regenerative power of the motor generator MG1.

On the other hand, if the battery 12 is in the charge prohibited state (the step S210: YES), it is determined whether or not the fixed transmission mode can be selected (step S220). Whether or not to perform the fixed transmission mode (which is, in the embodiment, a transmission mode that allows the motor generator MG1 in the lock state) is defined by a lock prohibition flag Lkih. The lock prohibition flag Lkih is set to "ON" if the fixed transmission mode can be performed, and is set to "OFF" if the fixed transmission mode cannot be performed.

The lock prohibition flag Lkih is set on the basis of the vehicle speed V and drive shaft required output Pdn. In other words, the implementation of the fixed transmission mode is allowed only in an allowable vehicle speed range, which is defined by an upper limit vehicle speed and a lower limit vehicle speed. Moreover, the implementation of the fixed transmission mode is prohibited during high-output traveling in which the drive shaft required output Pdn is greater than or equal to a predetermined value, because the drive shaft required output Pdn is covered basically by the engine output Pe. Regarding a condition for performing the fixed transmission mode, various known conditions can be applied.

If the battery 12 is in the charge prohibited state and if traveling in the fixed transmission mode is allowed (the step S220: YES), the second control is selected, and the engine brake required torque is small. Thus, the engine brake control according to the mode C described above is performed (step S230). In other words, the dog clutch mechanism 500 is set to be in the engaged state, and a part of the engine brake torque Teb, which is excessive for the engine brake required torque Tebn, is canceled by the power-running drive of the motor generator MG2, while a part of the engine brake required torque Tebn is burdened by the dog clutch mechanism 500.

On the other hand, if the battery 12 is in the charge prohibited state and if the traveling in the fixed transmission mode is prohibited (the step S220: NO), the third control is selected, and the engine brake required torque is small. Thus, the engine brake control according to the mode B described above is performed (step S240). In other words, the motor generator MG1 is power-driven, and a part of the engine brake torque Teb, which is excessive for the engine brake required torque Tebn, is canceled by the power-running drive of the motor generator MG2

As described above, according to the engine brake control process according to the embodiment, if the regenerative power in the first control conflicts with the charge limit value Win, the second control or the third control having charge-discharge characteristics reversed from those of the first control allows the engine brake required torque Tebn to act on the drive shaft DS. Therefore, desired engine brake can be generated as much as possible, regardless of the state of the battery 12.

Moreover, in the embodiment, the mode C (the second control) is prioritized over the mode B (the third control). This is because the mode C is more excellent in the point that power loss can be reduced, as a part of the engine brake required torque Tebn can be received or born by the dog clutch mechanism 500 in the mode C.

If the charge prohibited state of the battery 12 is caused by the SOC of the battery 12, the SOC of the battery 12 is near the maximum value in control (e.g. 80 to 90%), and it may be thus considered that the discharge limit value Wout described later is sufficiently large for the power-running power required for the engine brake control. Therefore, even in the case of the selection of the mode B, there is relatively high degree of freedom in the power-running power of the motor generators MG1 and MG2 (i.e. discharge power of the battery 12). However, except for some reasonable circumstances that promote active discharge of the battery 12, it is basically desirable that the hybrid vehicle 1 has less discharge power of the battery 12. Therefore, in the step S240, the motor generators MG1 and MG2 are preferably controlled in such a manner that the battery 12 has minimum discharge power in a range in which the engine brake required torque Tebn is satisfied.

There can be also assumed circumstances in which both the charge limit value Win described above and the discharge limit value Wout described later have small absolute values, such as a case where the battery 12 is in a low temperature state or a high temperature state. In this case, even if the second or third control is selected for the reason that the regenerative power by the first control conflicts with the charge limit value Win and the charge-discharge characteristics of the battery 12 accompanied by the implementation of the engine brake control are reversed, the power-running power likely conflicts with the discharge limit value Wout.

In this case, for example, the engine 200, the motor generator MG1, and the motor generator MG2 may be controlled in such a manner that the battery 12 has minimum charge-discharge balance, while the engine brake required torque Tebn is satisfied as much as possible. In this case, for example, the motor generator MG1 may be regeneratively driven in a range of the charge limit value Win, and the motor generator MG2 may be power-driven in a range of the discharge limit value Wout. Alternatively, if the dog clutch mechanism 500 can be controlled to be in the engaged state, the motor generator MG1 is locked and the power-running power of the motor generator MG2 is suppressed in a range in which the power-running power does not conflict with the discharge limit value Wout, by which second-best engine brake control may be realized.

Figure 8:
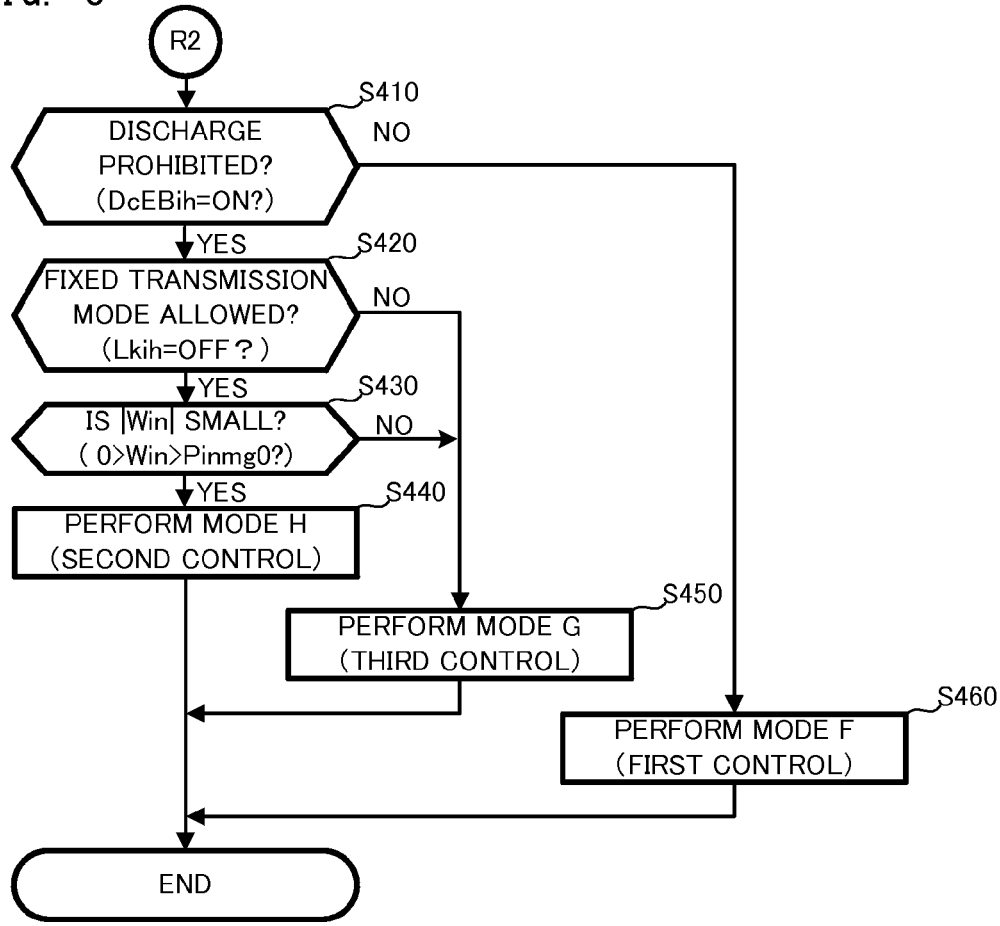
FIG. 8 is a flowchart illustrating a sub routine R2.

Next, with reference to FIG. 8, the sub routine R2 will be explained. FIG. 8 is a flowchart illustrating the sub routine R2.

In FIG. 8, it is firstly determined whether or not the battery 12 is in a discharge prohibited state (step S410).

Whether or not the battery 12 is in the discharge prohibited state is determined on the basis of a discharge prohibition flag DcEBih. The discharge prohibition flag DcEBih is a control flag that is set to "ON" if the battery 12 is in the discharge prohibited state and that is set to "OFF" if the battery 12 is not in the discharge prohibited state. The discharge prohibition flag DcEBih is set by a discharge prohibition flag setting process, which is performed by the power control unit 120 in parallel with the engine brake control process.

Figure 9:
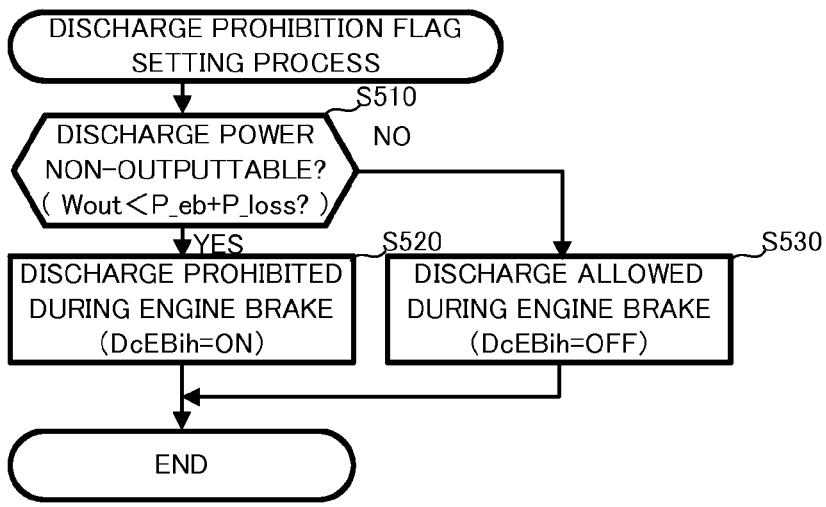
FIG. 9 is a flowchart illustrating a discharge prohibition flag setting process.

Now, with reference to FIG. 9, the discharge prohibition flag setting process will be explained. FIG. 9 is a flowchart illustrating the discharge prohibition flag setting process.

In FIG. 9, firstly, it is determined whether or not the battery 12 is discharge-power non-outputtable (step S510). Specifically, it is determined whether or not the following equation (5) holds.

$$\text{Wout} < \text{Pout} \quad (5)$$

Here, Wout is the discharge limit value of the battery 12. The discharge limit value Wout is determined, always with fluctuations, by another control unit that monitors the state of the battery 12. The discharge limit value Wout is determined mainly from the battery temperature Tbatt and the SOC.

A method of setting the discharge limit value Wiout is known, and the explanation thereof will be thus omitted. The discharge limit value Wout has an absolute value that decreases in a binary or stepwise manner with respect to a reference value if the battery temperature Tbatt is greater than or equal to the upper limit or less than or equal to the lower limit. This is because a discharging performance of the battery 12 relatively decreases at high temperature and low temperature.

Moreover, the discharge limit value Wout has an absolute value that decreases in a binary or stepwise manner with respect to the reference value as the SOC approaches a minimum value in control (e.g. SOC=10 to 20%). Moreover, if the SOC reaches the minimum value in control, Wout=0. This is because the battery 12 does not have room to discharge with decreasing the SOC. Moreover, the detection of the SOC by the SOC sensor 16 has a time lag with respect to a change in the actual SOC. Therefore, the discharge limit value Wout is set to Wout=0 at a time point at which the SOC reaches the minimum value in control, and the discharging is prohibited. Such an aspect of setting the discharge limit value Wout is one example. Practical benefits according to the present invention are received regardless of how to set the discharge limit value Wout.

In the case of Wout=0, the battery 12 is in the discharge prohibited state in a strict meaning. The "discharge prohibition" according to the discharge prohibition flag setting process, however, not only includes what is determined only by such the state of the battery 12 but also is determined by a relative relation between the discharge limit value Wout and the power-running power generated with the engine brake control.

In the above equation (5), Pout is a power-running power value when the engine brake required torque Tebn is allowed to act on the drive shaft DS, and is calculated on the basis of the following equation (6).

$$\text{Pout} = \text{Pebn} + \text{Ploss} \quad (6)$$

In the above equation (6), Ploss is the energy loss described above, and Pebn is the engine brake required output described above. Since the discharge limit value Wout is a positive value, the above equation (5) does not have a reversed sign of inequality on the basis of the absolute value.

If the battery 12 is discharge-power non-outputtable (the step S510: YES), the discharge prohibition flag DcEBih is set to ON, and the engine brake control accompanied by the discharging from the battery 12 is prohibited (S520). If the battery 12 is power-running power outputtable (the step S510: NO), the discharge prohibition flag DcEBih is set to OFF, and the engine brake control accompanied by the discharging from the battery 12 is allowed (S530).

The above equation (5) does not hold if Wout=0 and Pebn+Ploss=0. In the case of Wout=0, however, any power-running power cannot be outputted, and the step S510 thus branches to the YES side.

If the discharge prohibition flag DcEBih is set to any value, the discharge prohibition flag setting process is ended. The discharge prohibition flag setting process is repeatedly performed with a predetermined period.

Back in FIG. 8, if the battery 12 is not in the discharge prohibited state (the step S410: NO), the first control is selected, and the engine brake required torque is large. Thus, the engine brake control according to the mode F described above is performed (step S460). In other words, the engine brake required output Pebn is covered by the power-running power of the motor generator MG1.

On the other hand, if the battery 12 is in the discharge prohibited state (the step S410: YES), it is determined whether or not the fixed transmission mode can be selected (step S420). Whether or not to perform the fixed transmission mode (which is, in the embodiment, a transmission mode that allows the motor generator MG1 in the lock state) is defined by the lock prohibition flag Lkih, as described above.

If the battery 12 is in the discharge prohibited state and if the traveling in the fixed transmission mode is allowed (the step S420: YES), it is further determined whether or not the charge limit value Win (Win<0) is greater than a reference value Pinmg0 (i.e. whether or not |Win|<Pinmg0 is satisfied) (step S430).

Here, the reference value Pinmg0 is a regenerative power value when deficiency of the engine brake torque corresponding to the difference between the engine brake torque Teb0 and the engine brake required torque Tebn in the case of the number of MG1 revolutions Ng=0 is regenerated by the motor generator MG2.

If the battery 12 is in the discharge prohibited state and the traveling in the fixed transmission mode is allowed and the charge limit value Win is less than or equal to the reference value Pinmg0 (the step S430: NO), or if the battery 12 is in the discharge prohibited state and the traveling in the fixed transmission mode is prohibited (the step S420: NO), the third control is selected, and the engine brake required torque is large. Thus, the engine brake control according to the mode G described above is performed (step S450). In other words, the motor generator MG1 is regeneratively driven, and a part of the engine brake torque Teb, which is insufficient for the engine brake required torque Tebn, is compensated by the regenerative torque of the motor generator MG2.

On the other hand, if the charge limit value Win is greater than the reference value Pinmg0 (the step S430: YES), the second control is selected, and the engine brake required torque is large. Thus, the engine brake control according to the mode H described above is performed (step S440). In other words, the dog clutch mechanism 500 is set to be in the engaged state, and a part of the engine brake torque Teb, which is insufficient for the engine brake required torque Tebn, is compensated by the regenerative drive of the motor generator MG2, while a part of the engine brake required torque Tebn is burdened by the dog clutch mechanism 500.

As described above, according to the engine brake control process according to the embodiment, if the power-running power in the first control conflicts with the discharge limit value Wout, the second control or the third control having the charge-discharge characteristics reversed from those of the first control allows the engine brake required torque Tebn to act on the drive shaft DS. Therefore, the desired engine brake can be generated as much as possible, regardless of the state of the battery 12.

Moreover, in the embodiment, the mode G (the third control) is prioritized over the mode H (the second control). In other words, the mode G is performed if the battery 12 can receive the regenerative power by the mode G. This is because the absolute value of a maximum value of the regenerative power by the mode G is greater than the absolute value of the regenerative power by the mode H. In other words, the charging of the battery 12 can be more efficiently realized by prioritizing the mode G.

If the discharge prohibited state of the battery 12 is caused by the SOC of the battery 12, the SOC of the battery 12 is near the minimum value in control (e.g. 10 to 20%), and it may be thus considered that the charge limit value Win is sufficiently large (which, in this case, means the charge limit value Win has a large absolute value) for the regenerative power required for the engine brake control. Therefore, in the case of the selection of the mode G, there is relatively high degree of freedom in the regenerative power of the motor generators MG1 and MG2 (i.e. charge power of the battery 12). However, normally, it is basically desirable that the hybrid vehicle 1 has more charge power of the battery 12. Therefore, in the step S450, the motor generators MG1 and MG2 are preferably controlled in such a manner that the regenerative power is maximal in a range in which the regenerative power conflicts with the charge limit value Win.

The mode G is excellent in regenerative efficiency; however, the motor generator MG1 has a higher calorific value than that in the mode H because the drive of the motor generator MG1 is accompanied. In view of this point, in a circumstance in which the motor generator MG1 has a high thermal load (e.g. in a circumstance in which temperature is relatively high, or in similar circumstances), the mode H in which the motor generator MG1 is locked may be selected for the purpose of preventing a temperature increase of the motor generator MG1, before or after the selection of the mode G.

On the other hand, as in the case where the engine brake required torque is small, there can be also assumed circumstances in which both the discharge limit value Wout and the charge limit value Win have small absolute values, such as the case where the battery 12 is in the low temperature state or the high temperature state. In this case, even if the second or third control is selected for the reason that the power-running power by the first control conflicts with the discharge limit value Wout and the charge-discharge characteristics of the battery 12 accompanied by the implementation of the engine brake control are reversed, the regenerative power likely conflicts with the charge limit value Win.

In this case, for example, the engine 200, the motor generator MG1, and the motor generator MG2 may be controlled in such a manner that the battery 12 has minimum charge-discharge balance, while the engine brake required torque Tebn is satisfied as much as possible. In this case, for example, the motor generator MG1 may be power-driven, and the motor generator MG2 may be regeneratively driven.

Alternatively, if the dog clutch mechanism 500 can be controlled to be in the engaged state, the motor generator MG1 is locked and the regenerative power of the motor generator MG2 is suppressed in a range in which the regenerative power does not conflict with the charge limit value Win, by which second-best engine brake control may be realized.

Figure 10:
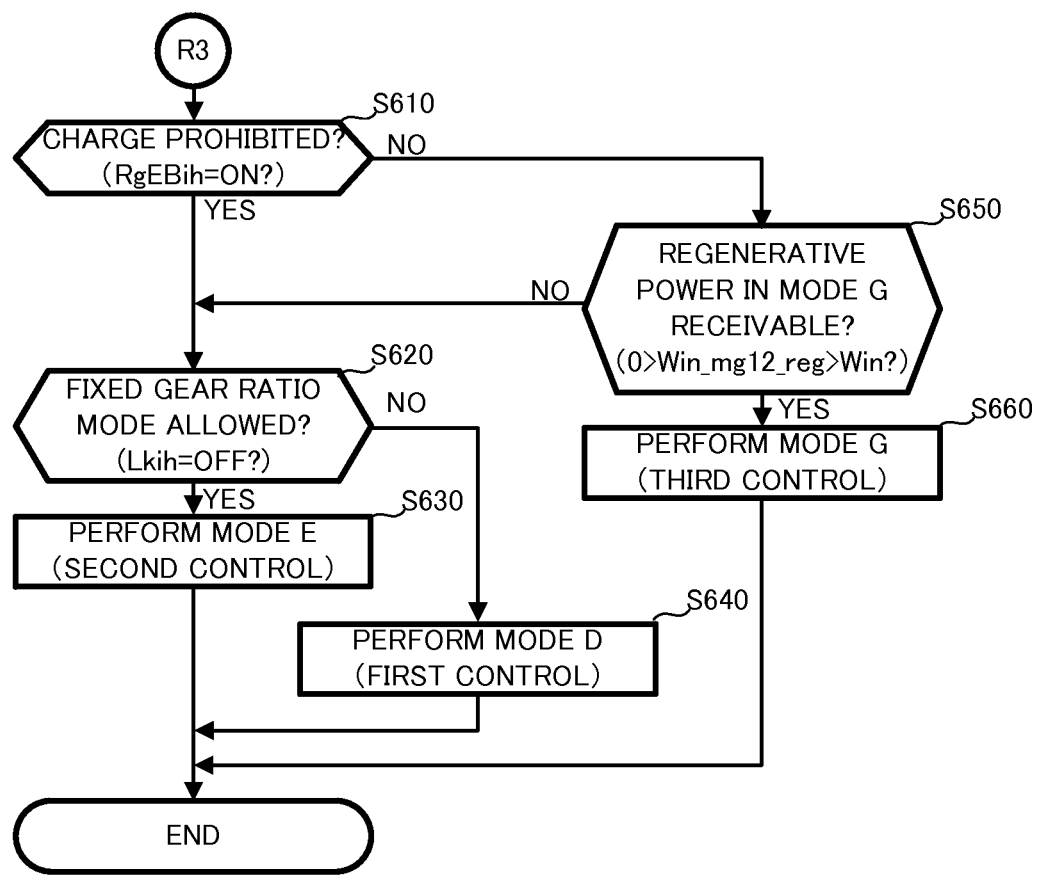
FIG. 10 is a flowchart illustrating a sub routine R3.

Next with reference to FIG. 10, the sub routine R3 will be explained. FIG. 10 is a flowchart illustrating the sub routine R3.

In FIG. 10, it is firstly determined whether or not the battery 12 is in the charge prohibited state (step S610). Whether or not the battery 12 is in the charge prohibited state is determined on the basis of the change prohibition flag RgEBih already described.

In the embodiment, if the engine brake required torque is medium, the engine brake required output Pebn and the energy loss Ploss balance out. It is therefore only the case of the charge limit value Win=0 that the change prohibition flag RgEBih is ON.

If the battery 12 is in the charge prohibited state (the step S610: YES), i.e. if the charge limit value Win=0, it is determined whether or not the fixed transmission mode is allowed on the basis of the lock prohibition flag LKih described above (step S620). If the traveling in the fixed transmission mode is allowed (the step S620: YES), the second control is selected, and the engine brake required torque is medium. Thus, the engine brake control according to the mode E described above is performed (step S630). In other words, the dog clutch mechanism 500 is set to be in the engaged state, and the engine brake required torque Tebn is burdened by the dog clutch mechanism 500. In this case, power consumption in the engine brake control is only power consumption required to maintain the dog clutch mechanism 500 in the engaged state.

On the other hand, if the battery 12 is in the charge prohibited state and the traveling in the fixed transmission mode is prohibited (the step S620: NO), the first control is selected, and the engine brake required torque is medium. Thus, the engine brake control according to the mode D described above is performed (step S640). In other words, the engine brake torque Teb0 that balances with the engine brake required torque Tebn is supplied to the drive shaft DS by the engine friction torque Tefr0 that balances with the MG1 torque Tg=Tg0.

As described above, in the sub routine R3, as in the sub routine R1, if the fixed transmission mode is allowed, the engine brake control with the power loss suppressed as much as possible is realized by the fixed transmission mode having less power loss than that in the CVT mode.

On the other hand, if the battery 12 is not in the charge prohibited state in the step S610 (the step S610: NO), i.e. if substantially |Win|>0, it is determined whether or not the battery 12 can receive the regenerative power by the mode G of the third control (step S650). Specifically, it is determined whether or not the following equation (7) holds.

$$0 > \text{Pinmin} > \text{Win} \qquad (7)$$

Here, Pinmin is minimum regenerative power in the mode G. In the mode G, both the motor generator MG1 and the motor generator MG2 are regeneratively driven. In the case of the selection of the mode G, the engine torque, which is insufficient by driving the motor generator MG1 in the regeneration region, needs to be provided or covered by the regenerative drive of the motor generator MG2. The minimum value of the regenerative power is determined by electrical specification of each motor generator (e.g. torque control accuracy) and the number of drive shaft revolutions Nds (which is uniquely the vehicle speed V). The minimum regenerative power Pinmin is operated or calculated by the power control unit 120 at each time.

If the battery 12 can receive the minimum regenerative power Pinmin (the step S650: YES), the third control is selected, and the engine brake control according to the mode G is performed (step S660). In other words, the motor generator MG1 is regeneratively driven, and a part of the engine brake torque Teb, which is insufficient for the engine brake required torque Tebn, is compensated by the regenerative torque of the motor generator MG2.

If the battery 12 cannot receive the minimum regenerative power Pinmin (the step S650: NO), the process is moved to the step S620, and the second control (mode E) or the first control (mode D) is performed according to whether or not the fixed transmission mode is allowed.

As described above, in the sub routine R3, the engine brake control by the mode G is realized in a range in which the regenerative power by the motor G can be received. It is therefore possible to efficiently charge the battery 12.

In the sub routine R3, which is performed if the engine brake required torque is medium, the discharge limit value Wout may have any value. This is because the discharge from the battery 12 does not have to be promoted in circumstances in which the engine brake required output Pebn and the energy loss Ploss originally balance out. On a practical operational side, however, the third control (i.e. mode B) accompanied by the discharge may be performed, as occasion demands, for example, in circumstances in which the discharge from the battery 12 can be actively required, such as, for example, in a case where the SOC of the battery 12 is greater than or equal to the maximum value in control. In any case, the problems to be solved by the present invention are solved in the point that the engine brake control is performed.

<Modified Example>

The embodiment described above is configured in such a manner that the motor generator MG1 is fixed in the non-rotatable manner by the dog clutch mechanism 500. A practical aspect associated with a relation between the engagement mechanism and the differential mechanism according to the present invention, however, is not limited such a configuration. In other words, it is possible to change a lock target of the dog clutch mechanism 500 by changing the configuration of the power dividing mechanism, which is the differential mechanism according to the present invention, from the power dividing mechanism 300 described above. Now, a configuration and operation of such a power dividing mechanism 301 will be explained.

Figure 11:
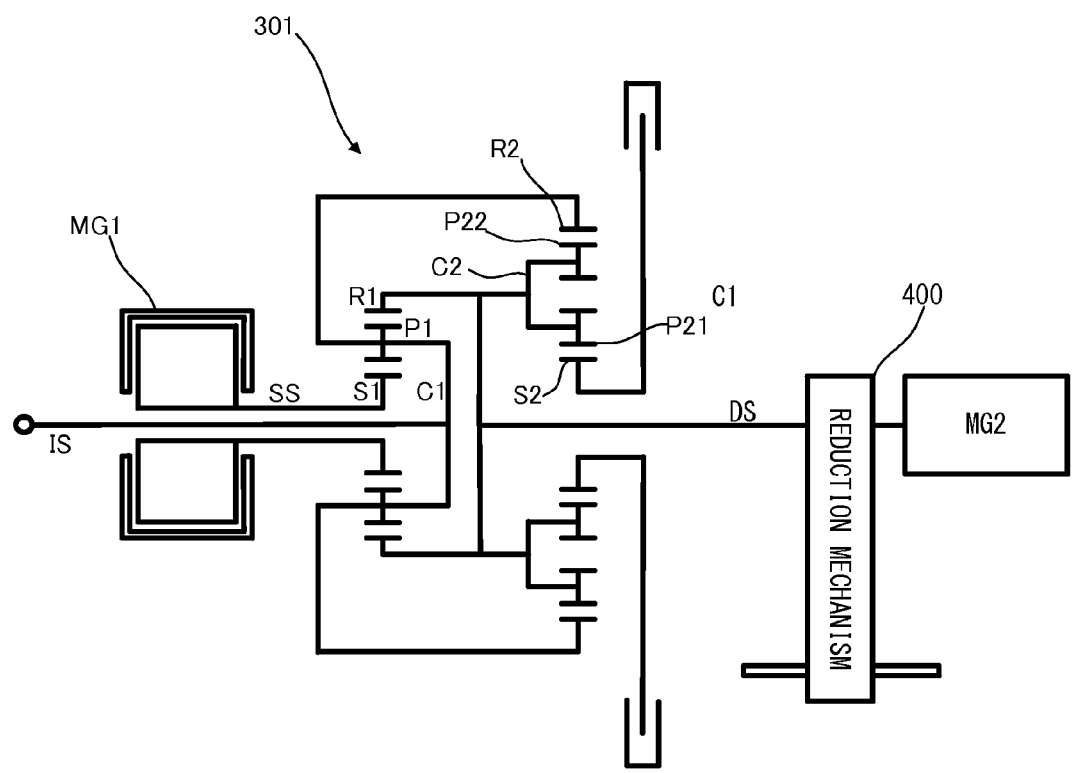
FIG. 11 is a schematic configuration diagram illustrating a power dividing mechanism in a modified example.

Firstly, with reference to FIG. 11, the configuration of the power dividing mechanism 301 will be explained. FIG. 11 is a schematic configuration diagram illustrating the power dividing mechanism 301. In FIG. 11, the same parts as those in FIG. 2 will carry the same reference numeral, and the explanation thereof will be omitted as occasion demands.

In FIG. 11, the power dividing mechanism 301 is provided with two pairs of differential mechanisms, and one differential mechanism (conveniently referred to as a first differential mechanism) has the same configuration as that of the power dividing mechanism 300, which is a single pinion gear type planetary gear mechanism in the first embodiment. In other words, the planetary carrier C1 is coupled with the input shaft IS, and the sun gear S1 is coupled with the sun gear shaft SS, and the ring gear R1 is coupled with the drive shaft DS.

On the other hand, the other differential mechanism (conveniently referred to as a second differential mechanism) is provided with a sun gear S2, a carrier C2, and a ring gear R2, which exhibit a differential action for each other, a pinion gear P21 meshing with the sun gear S2 and a pinion gear P22 meshing with the ring gear R2, which are respectively held by the carrier C2 so as to rotate on their own axes in an axial direction and to revolve by the rotation of the carrier C2. In other words, the other differential mechanism is configured as a so-called double pinion gear type planetary gear mechanism.

The first and second differential mechanisms are coupled with each other by coupling the ring gear R2 in the second differential mechanism with the carrier C1 in the first differential mechanism and by coupling the carrier C2 in the second differential mechanism with the ring gear R2 in the first differential mechanism. The power dividing mechanism 301 is a so-called Ravigneaux type planetary gear mechanism as a whole. The power dividing mechanism 301 is provided with four rotating elements in total, which are the sun gear S1, the carrier C1 and the ring gear R2, the ring gear R1 and the carrier C2, and the sun gear S2.

Now, in the modified example, the sun gear S2 in the second differential mechanism is configured to be coupled with the dog clutch mechanism 500. In other words, if the dog clutch mechanism 500 is in the engaged state, the sun gear S2 in the second differential mechanism is fixed in the non-rotatable manner.

Figure 12:
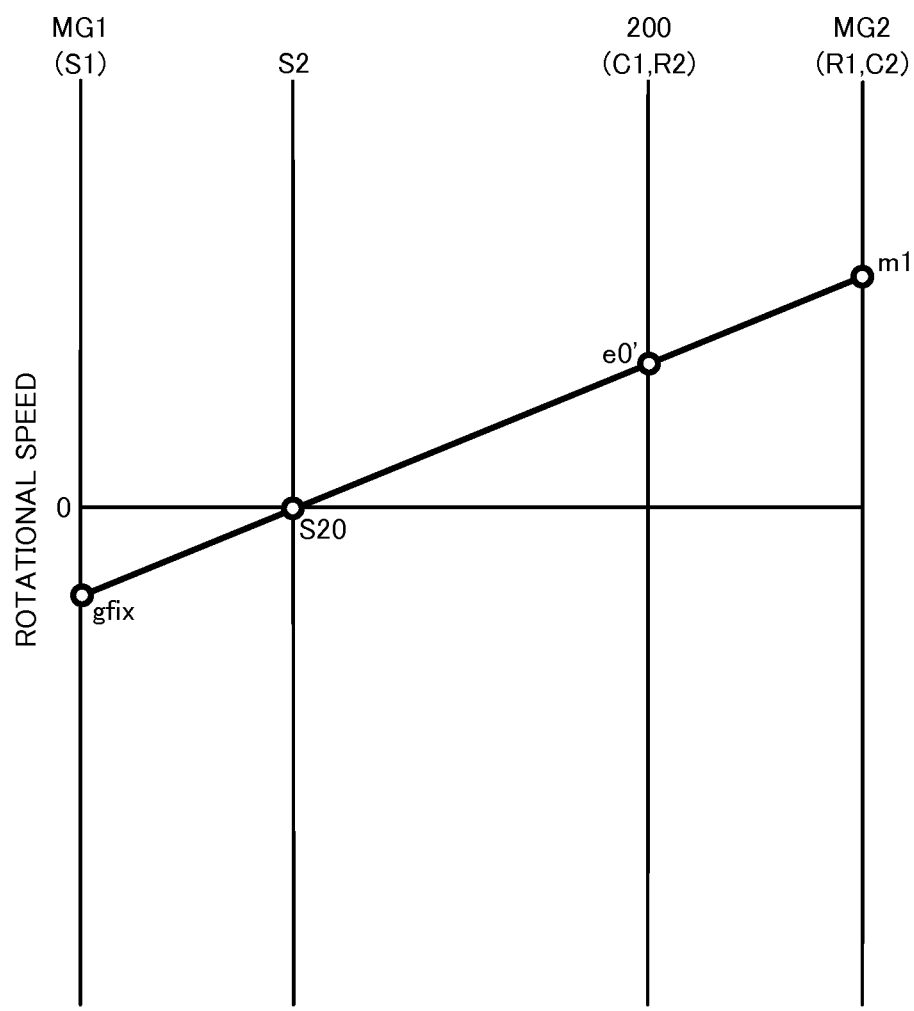
FIG. 12 is an operating nomogram corresponding to a lock state in the power dividing mechanism in FIG. 11.

Here, in a state in which the sun gear S2 is fixed in the non-rotatable manner, the rotation of the motor generator MG1 is limited, and the number of MG1 revolutions Ng is substantially fixed to one vale. This will be explained with reference to FIG. 12. FIG. 12 is an operating nomogram corresponding to the state in which the sun gear S2 is locked in the power dividing mechanism 301. In FIG. 12, the same parts as those in FIG. 4 will carry the same reference numeral, and the explanation thereof will be omitted as occasion demands.

FIG. 12 illustrates, from the left, the motor generator MG1, the sun gear S2, the engine 200, and the motor generator MG2 (or uniquely the drive shaft DS). Moreover, FIG. 12 illustrates the operating nomogram in the state in which the sun gear S2 is locked by the dog clutch mechanism 500.

If the sun gear S2 is locked by the dog clutch mechanism 500 in a case where the operating point of the motor generator MG2 is an illustrated operating point m, the operating point of the sun gear S2 is fixed to an operating point S20 corresponding to zero rotation. The operating point of the engine 200 is necessarily fixed to an illustrated operating point e0'.

In this state, however, the operating point of the sun gear S1, which is the remaining differential element of the power dividing mechanism 301, is also fixed to an illustrated operating point gfix. In other words, although the motor generator MG1 is not directly locked by the dog clutch mechanism 500, the number of revolutions thereof is substantially fixed.

Even in the modified example, the reaction torque of the sun gear shaft torque Tes is received or born via the dog clutch mechanism 500. Thus, the fixed transmission mode is realized as in the various embodiment described above. Necessarily, it is possible to apply the same control as the engine brake control in the embodiment described above.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A hybrid vehicle control apparatus configured to control a hybrid vehicle comprising:
    an engine;
    a drive shaft connected to drive wheels;
    a first electrical rotating machine;
    a differential mechanism comprising a plurality of rotating elements that perform a differential action on each other, including rotating elements each of which is coupled with the engine, the electrical rotating element, or the drive shaft;
    a second electrical rotating machine coupled with the drive shaft; and
    an engagement mechanism configured to fix one of the plurality of rotating elements in a non-rotatable manner in an engaged state in which a pair of engaging elements are engaged with each other and to limit rotation of the first electrical rotating machine,
    said hybrid vehicle control apparatus comprising:
    a specifying device configured to specify a state of a power supply related to power input/output limit; and
    a controlling device configured to select and perform one control on the basis of the specified state of the power supply and required torque of engine brake, from among a plurality of controls including (1) first control in which the engagement mechanism is controlled to be in a disengaged state in which the pair of engaging elements are disengaged from each other and the first electrical rotating machine is controlled according to the required torque of the engine brake and (2) second control in which the engagement mechanism is set to be in the engaged state and the second electrical rotating machine is controlled according to the required torque, if the engine brake is required during operation of the engine.

2. The hybrid vehicle control apparatus according to claim 1, wherein
    the state of the power supply is a charge limit value and a discharge limit value, which are set on the basis of at least one of temperature of the power supply and a remaining charge amount, and
    said controlling device selects the second control (1) if regenerative power of the first electrical rotating machine by the first control exceeds the charge limit value, and/or (2) if power-running power of the first electrical rotating machine by the first control exceeds the discharge limit value.

3. The hybrid vehicle control apparatus according to claim 2, wherein
    the plurality of controls include third control in which the engagement mechanism is controlled to be in the disengaged state and in which the first and second electrical rotating machines are controlled according to the required torque in such a manner that regenerative and power-running characteristics are reversed from those in the first control, and
    said controlling device selects the second control if the power-running power of the first electrical rotating machine in the first control exceeds the discharge limit value and if regenerative power of the first and second electrical rotating machines in the third control exceeds the charge limit value.

4. The hybrid vehicle control apparatus according to claim 3, wherein
    the engagement mechanism sets the first electrical rotating machine to be non-rotatable in the engaged state, and
    said controlling device selects the second control if the required torque corresponds to engine brake torque when number of revolutions of the first electrical rotating machine is zero in the first control.

5. The hybrid vehicle control apparatus according to claim 4, wherein
the state of the power supply is a charge limit value and a discharge limit value, which are set on the basis of at least one of temperature of the power supply and a remaining charge amount, and
the plurality of controls include third control in which the engagement mechanism is controlled to be in the disengaged state and in which the first and second electrical rotating machines are controlled according to the required torque in such a manner that regenerative and power-running characteristics are reversed from those in the first control, and
said controlling device selects the second control if the required torque corresponds to engine brake torque when number of revolutions of the first electrical rotating machine is zero in the first control and further if regenerative power in the third control exceeds the charge limit value.

6. The hybrid vehicle control apparatus according to claim 2, wherein
the engagement mechanism sets the first electrical rotating machine to be non-rotatable in the engaged state, and
said controlling device selects the second control if the required torque corresponds to engine brake torque when number of revolutions of the first electrical rotating machine is zero in the first control.

7. The hybrid vehicle control apparatus according to claim 6, wherein
the state of the power supply is a charge limit value and a discharge limit value, which are set on the basis of at least one of temperature of the power supply and a remaining charge amount, and
the plurality of controls include third control in which the engagement mechanism is controlled to be in the disengaged state and in which the first and second electrical rotating machines are controlled according to the required torque in such a manner that regenerative and power-running characteristics are reversed from those in the first control, and
said controlling device selects the second control if the required torque corresponds to engine brake torque when number of revolutions of the first electrical rotating machine is zero in the first control and further if regenerative power in the third control exceeds the charge limit value.

8. The hybrid vehicle control apparatus according to claim 1, wherein
the engagement mechanism sets the first electrical rotating machine to be non-rotatable in the engaged state, and
said controlling device selects the second control if the required torque corresponds to engine brake torque when number of revolutions of the first electrical rotating machine is zero in the first control.

9. The hybrid vehicle control apparatus according to claim 4, wherein
the state of the power supply is a charge limit value and a discharge limit value, which are set on the basis of at least one of temperature of the power supply and a remaining charge amount, and
the plurality of controls include third control in which the engagement mechanism is controlled to be in the disengaged state and in which the first and second electrical rotating machines are controlled according to the required torque in such a manner that regenerative and power-running characteristics are reversed from those in the first control, and
said controlling device selects the second control if the required torque corresponds to engine brake torque when number of revolutions of the first electrical rotating machine is zero in the first control and further if regenerative power in the third control exceeds the charge limit value.

* * * * *